US011963210B2

(12) United States Patent
Moon et al.

(10) Patent No.: US 11,963,210 B2
(45) Date of Patent: Apr. 16, 2024

(54) APPARATUS AND METHOD FOR SYNCHRONIZATION USING WIRELESS COMMUNICATION NETWORK IN WIRELESS COMMUNICATION SYSTEM

(71) Applicant: Samsung Electronics Co., Ltd., Suwon-si (KR)

(72) Inventors: Sangjun Moon, Suwon-si (KR); Jungshin Park, Suwon-si (KR); Beomsik Bae, Suwon-si (KR); Youngkyo Baek, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 17/360,124

(22) Filed: Jun. 28, 2021

(65) Prior Publication Data

US 2021/0329667 A1 Oct. 21, 2021

Related U.S. Application Data

(63) Continuation of application No. 16/593,295, filed on Oct. 4, 2019, now Pat. No. 11,051,321.

(30) Foreign Application Priority Data

Oct. 5, 2018 (KR) .................. 10-2018-0118904

(51) Int. Cl.
*H04W 72/50* (2023.01)
(52) U.S. Cl.
CPC ............................... *H04W 72/535* (2023.01)
(58) Field of Classification Search
CPC ......... H04M 15/8038; H04M 15/8083; H04M 15/8228; H04M 15/66; H04W 28/0268;
(Continued)

(56) References Cited

U.S. PATENT DOCUMENTS 7,657,677 B2   2/2010  Huang et al.
8,310,395 B2  11/2012  Oehler
(Continued)

FOREIGN PATENT DOCUMENTS

KR  10-2010-0021167 A   2/2010
RU         2636581 C2  11/2017
(Continued)

OTHER PUBLICATIONS

Extended European Search Report dated Nov. 19, 2021, issued in a counterpart European Application No. 19868833.5-1215 / 3861805.
(Continued)

*Primary Examiner* — David Q Nguyen
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as long term evolution (LTE). According to various embodiments of the disclosure, an operating method of a user plane function (UPF) in a wireless communication system and an apparatus therefor are provided. The operating method includes receiving a first parameter for clock synchronization from a base station, and performing the clock synchronization with a neighboring network system using the received first parameter and a second parameter. The first parameter may include information relating to a link delay time between the neighboring network system and a network system comprising the UPF, and a residence time of a terminal, a base station and the UPF of the network system comprising the UPF, and the second parameter may include information relating to a backhaul delay time between the base station and the UPF.

20 Claims, 19 Drawing Sheets

(58) Field of Classification Search
CPC ..... H04W 28/24; H04W 76/12; H04W 28/16; H04W 28/0289; H04W 28/18; H04W 28/0236; H04L 47/2483
USPC .......................................... 370/328, 329, 330
See application file for complete search history.

(56) References Cited

U.S. PATENT DOCUMENTS

| | | |
|---|---|---|
| 2007/0280260 A1 | 12/2007 | Ryu et al. |
| 2008/0008203 A1 | 1/2008 | Frankkila et al. |
| 2010/0040090 A1 | 2/2010 | Lee et al. |
| 2014/0286256 A1 | 9/2014 | Chowdhury et al. |
| 2018/0083886 A1 | 3/2018 | Peitzer et al. |
| 2018/0124647 A1* | 5/2018 | Dai ..................... H04W 28/18 |
| 2019/0036590 A1 | 1/2019 | Nagaraja et al. |
| 2019/0059066 A1 | 2/2019 | Harmatos et al. |
| 2019/0306924 A1 | 10/2019 | Zhang et al. |
| 2020/0053525 A1 | 2/2020 | Byun et al. |
| 2020/0053613 A1 | 2/2020 | Cirik et al. |
| 2020/0404559 A1 | 12/2020 | Koskela et al. |

FOREIGN PATENT DOCUMENTS

| | | | |
|---|---|---|---|
| TW | 201427447 A * | 7/2014 | ............ H04W 24/08 |
| WO | 2018/066905 A1 | 4/2018 | |

OTHER PUBLICATIONS

Russian Office Action dated Feb. 4, 2022, issued in a counterpart European Application No. RU2021107113.
Huawei, HiSilicon; Update the QoS monitoring solution for URLLC service; SA WG2 Meeting #128bis, S2-187957; Aug. 24, 2018, Sophia Antipolis, France.
Nokia, Nokia Shanghai Bell; TSN—QoS Framework; SA WG2 Meeting #128-Bis, S2-188101; Aug. 24, 2018, Sophia Antipolis, France.
ETSI Gs NGP 008 V 0.0.3; Next Generation Protocols (NGP); Mobile Deterministic Networking; Group Specification; Jun. 2018.
Nokia, Nokia Shanghai Bell; Synchronization; SA WG2 Meeting #128-Bis, S2-188103; Aug. 24, 2018, Sophia Antipolis, France.
Huawei, HiSilicon; Solution for QoS Monitoring for URLLC Services; SA WG2 Meeting #128, S2-187398; Jul. 6, 2018, Vilnius, Lithuania.
Huawei, HiSilicon; QoS Negotiation between 3GPP and TSN networks KI#3.1; SA WG2 Meeting #128Bis, S2-188233; Aug. 24, 2018, Sophia Antipolis, France.
Indian Office Action dated Nov. 16, 2023, issued in a counterpart Indian Application No. 202137020379.
Extended European Search Report dated Dec. 16, 2022, issued in a counterpart European Application No. 22190484.0-1215.
Huawei, HiSilicon; Solution for QoS Monitoring for URLLC Services; SA WG2 Meeting #128; S2-186945, Jul. 6, 2018, Vilnius, Lithuania.
Russian Decision on Grant dated Jul. 1, 2022, issued in a counterpart Russian Application No. 2021107113.
3rd Generation Partnership Project; Technical Specification Group Services and System Aspects; Study on enhancement of 5G System (5GS) for vertical and Local Area Network (LAN) services. 3GPP TR 23.734 V16.2.0; (Release 16), Jun. 2019.
3rd Generation Partnership Project; Technical Specification Group Core Network and Terminals; General Packet Radio System (GPRS) Tunnelling Protocol User Plane (GTPv1-U), 3GPP TS 29.281 V15.6.0;(Release 15), Sep. 2019.
3rd Generation Partnership Project; Technical Specification Group Services and System Aspects; Telecommunication management; Subscriber and equipment trace; Trace control and configuration management; 3GPP TS 32.422 V15.2.0 (Release 15), Jun. 2019.
International Search Report dated Jan. 21, 2020, issued in an International application No. PCT/KR2019/013059.
Huawei, HiSilicon; Solution for QoS Monitoring for URLLC Services; S2-187398; Jul. 6, 2018.
Samsung; Time Synchronization Support of 3GPP Network; S2-188125; Aug. 24, 2018.
Weidong Shi et al.; Efficient Implementation of Packet Scheduling Algorithm on High-Speed Programmable Network Processors; Oct. 2002.
Samsung, Deterministic Communication QoS Class, S2-1901932, 3GPP TSG-SA WG2 Meeting #1130, Feb. 19, 2019.
Korean Notice of Patent Grant dated Nov. 6, 2023, issued in Korean Patent Application No. 10-2018-0118904.
Chinese Office Action dated Nov. 23, 2023, issued in Chinese Patent Application No. 201980064751.0.

* cited by examiner

APPARATUS AND METHOD FOR SYNCHRONIZATION USING WIRELESS COMMUNICATION NETWORK IN WIRELESS COMMUNICATION SYSTEM

CROSS-REFERENCE TO RELATED APPLICATION(S)

This application is a continuation application of prior application Ser. No. 16/593,295, filed on Oct. 4, 2019, which is based on and claims priority under 35 U.S.C. § 119 of a Korean patent application number 10-2018-0118904, filed on Oct. 5, 2018, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for synchronization using a wireless communication network in the wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As mobile communication technology advances, a need for clock synchronization which has been provided only in a wired network arises in a wireless network as well. Hence, what is demanded is a solution for providing the clock synchronization between terminals by interworking a time sensitive network (TSN) and a support wired network by means of the wireless communication network, that is, a $3^{rd}$ generation partnership project (3GPP) 5G system (5GS).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for synchronization using a wireless communication network in a wireless communication system.

Another aspect of the disclosure is to provide an apparatus and a method for addressing a propagation delay asymmetric problem of an uplink (UL) and a downlink (DL) of an air link, to support a clock synchronization function which has been supported only in a wired network supporting a time sensitive network (TSN), in a wireless communication system supporting a $5^{th}$ generation system (5GS) as well.

Additional aspects will be set forth in part in the description which follows and, in part, will be apparent from the description, or may be learned by practice of the presented embodiments.

In accordance with an aspect of the disclosure, a method for operating an apparatus in a wireless communication system, the method comprising: receiving a message including at least one parameter indicative of packet delay budget (PDB), loss tolerance, and priority; and scheduling a packet based on the message and a pre-stored delay time value.

In accordance with an aspect of the disclosure, an apparatus in a wireless communication system, the apparatus comprising: a transceiver; and at least one processor operably coupled to the transceiver and configured to: receive a message including at least one parameter indicative of packet delay budget (PDB), loss tolerance, and priority, and schedule a packet based on the message and a pre-stored delay time value.

In accordance with an aspect of the disclosure, an operating method of a user plane function (UPF) in a wireless communication system is provided. The operating method includes receiving a first parameter for clock synchronization from a base station, and performing the clock synchronization with a neighboring network system using the received first parameter and a second parameter, wherein the first parameter may include information relating to a link delay time between the neighboring network system and a network system comprising the UPF, and a residence time of a terminal, a base station and the UPF of the network system comprising the UPF, and the second parameter may include information relating to a backhaul delay time between the base station and the UPF.

In accordance with another aspect of the disclosure, an operating method of a terminal in a wireless communication system is provided. The operating method includes receiving a third parameter for clock synchronization from a base station, and performing the clock synchronization with a neighboring network system using the received third parameter and a fourth parameter, wherein the third parameter may include information relating to a link delay time between the neighboring network system and a network system comprising a UPF, and an air link delay time between the terminal and a base station of the network system comprising the UPF, and the fourth parameter is provided. The operation method includes information relating to a residence time of the terminal.

In accordance with another aspect of the disclosure, a UPF in a wireless communication system is provided. The UPF includes a transceiver for receiving a first parameter for clock synchronization from a base station, and at least one processor for performing the clock synchronization with a neighboring network system using the received first parameter and a second parameter, wherein the first parameter may include information relating to a link delay time between the neighboring network system and a network system comprising the UPF, and a residence time of a terminal, a base station and the UPF of the network system comprising the UPF, and the second parameter may include information relating to a backhaul delay time between the base station and the UPF.

In accordance with another aspect of the disclosure, a terminal in a wireless communication system is provided. The terminal includes a transceiver for receiving a third parameter for clock synchronization from a base station, and at least one processor for performing the clock synchronization with a neighboring network system using the received third parameter and a fourth parameter, wherein the third parameter may include information relating to a link delay time between the neighboring network system and a network system comprising the UPF, and an air link delay time between the terminal and a base station of the network system comprising the UPF, and the fourth parameter may include information relating to a residence time of the terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
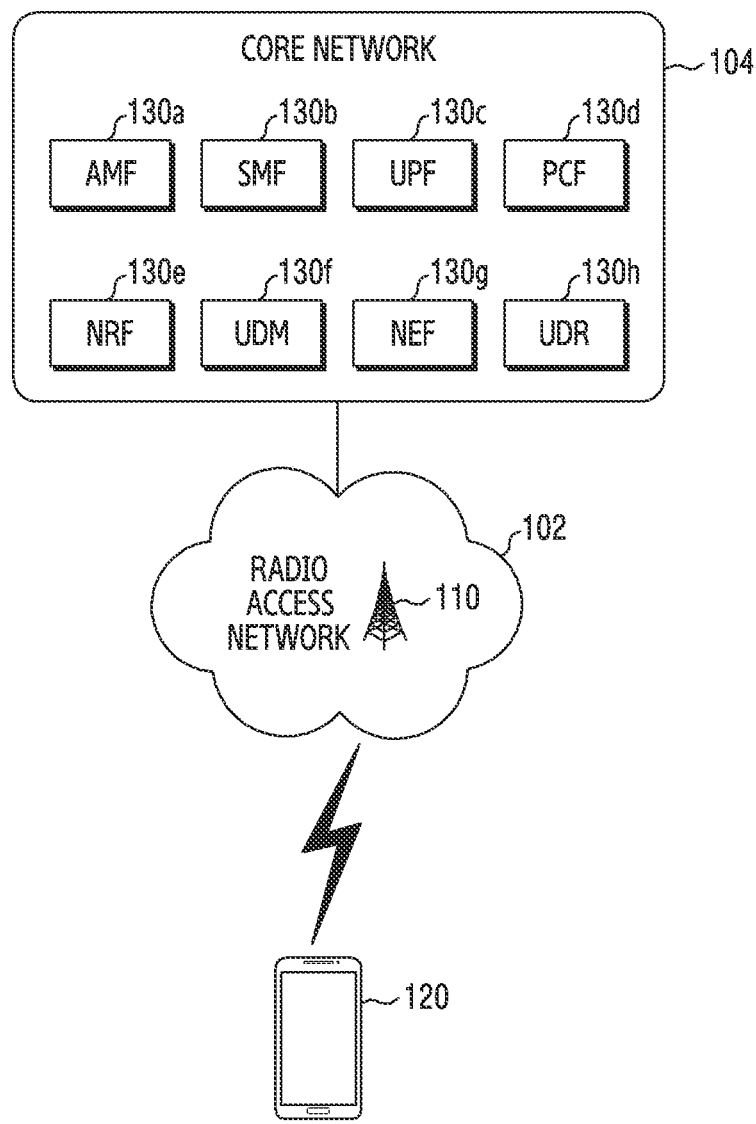
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure to be described below, a hardware approach will be described as an example. However, since the various embodiments of the disclosure include a technology using both hardware and software, the various embodiments of the disclosure do not exclude a software-based approach.

Hereafter, the disclosure relates to an apparatus and a method for synchronization using a wireless communication network in a wireless communication system. Specifically, the disclosure provides a technique for supporting clock synchronization of the wireless communication network, by determining a residence time of entities in the wireless communication network, an air delay between a terminal and a base station, and a backhaul (BH) delay between the base station and a core network entity in the wireless communication system.

Terms identifying access nodes, terms indicating network entities, terms indicating messages, terms indicating interfaces between network entities, and terms indicating various identification information, which are used in the following descriptions, are for the sake of explanations. Accordingly, the disclosure is not limited to the terms to be described, and may use other terms having technically identical meaning.

To facilitate explanations, the disclosure adopts terms and names defined in the latest standard $5^{th}$ generation system (5GS) and new radio (NR) standard defined by $3^{rd}$ generation partnership project (3GPP) among current communication standards. Notably, the disclosure is not limited by the terms and the names, and may be equally applied to a wireless communication network of other standard. In particular, the disclosure may be applied to a 3GPP 5GS/NR.

FIG. 1 illustrates a wireless communication system according to an embodiment of the disclosure.

Referring to FIG. 1, the wireless communication system includes a radio access network (RAN) 102 and a core network (CN) 104.

The RAN 102 is a network directly connected to a user device, for example, a terminal 120, and is an infrastructure for providing radio access to the terminal 120. The RAN 102 includes a set of base stations including a base station 110, and the base stations may perform communication through interfaces formed between them. At least some of the interfaces between the base stations may be wired or wireless. The base station 110 may be divided into a central unit (CU) and a distributed unit (DU) in structure. In this case, one CU may control a plurality of DUs. The base station 110 may be referred to as, an access point (AP), a network generation node B (gNB), a $5^{th}$ generation node (5G node), a wireless point, a transmission/reception point (TRP), or other term having a technically equivalent meaning. The terminal 120 may access the RAN 102, and communicates with the base station 110 over a radio channel. The terminal 120 may be referred to as a user equipment (UE), a mobile station, a subscriber station, a remote terminal, a wireless terminal, or a user device, or other term having a technically equivalent meaning.

The core network 104 may, as a network for managing the whole system, controls the RAN 102, and process data and control signals for the terminal 120 which are transmitted and received over the RAN 102. The core network 104 performs various functions such as control of a user plane and a control plane, mobility processing, subscriber information management, charging, interworking with other type of the system (e.g., a long term evolution (LTE) system). To execute such various functions, the core network 104 may include a plurality of entities which are functionally separated with different network functions (NFs). For example, the core network 104 may include access and mobility management function (AMF) 130a, session management function (SMF) 130b, user plane function (UPF) 130c, policy and charging function (PCF) 130d, network repository function (NRF) 130e, user data management (UDM) 130f, network exposure function (NEF) 130g, and unified data repository (UDR) 130h.

The terminal 120 is connected to the RAN 102 and accesses the AMF 130a which performs mobility management function of the core network 104. The AMF 130a is a function or a device which manages both of the access of the RAN 102 and the mobility management of the terminal 120. The SMF 130b is an NF which manages a session. The AMF 130a is connected to the SMF 130b, and the AMF 130a routes a session related message of the terminal 120 to the SMF 130b. The SMF 130b allocates a user plane resource to be provided to the terminal 120 by connecting to the UPF 130c, and establishes a tunnel for transmitting data between the base station 110 and the UPF 130c. The PCF 130d controls information of policy and charging for the session used by the terminal 120. The NRF 130e stores information of NFs installed in a mobile communication provider network, and notifies the stored information. The NRF 130e may be connected with all the NFs. If driving in the provider network, the NFs each register to the NRF 130e and thus notify the NRF 130e that the corresponding NF is driving in the network. The UDM 130f is an NF which serves a similar role to a home subscriber server (HSS) of a 4G network, and stores subscription information of the terminal 120, or context used by the terminal 120 in the network.

The NEF 130g connects a third party server and the NF of the 5G mobile communication system. In addition, the NEF 130g provides or updates data to the UDR 130h, or acquires data. The UDR 130h stores the subscription information of the terminal 120, stores the policy information, stores data exposed to outside, or stores necessary information for a third party application. In addition, the UDR 130h provides the stored data to another NF.

Figure 2:
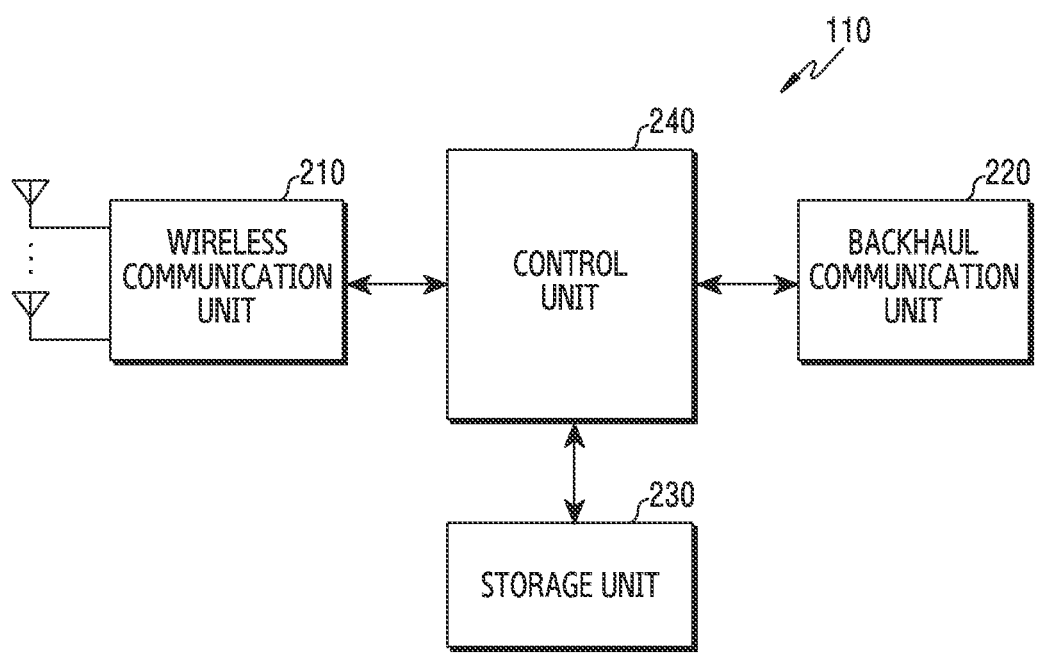
FIG. 2 illustrates a configuration of a base station in a wireless communication system according to an embodiment of the disclosure.

FIG. 2 illustrates a configuration of a base station in a wireless communication system according to embodiment of the disclosure. The configuration of FIG. 2 may be understood as the configuration of the base station 110. A term such as 'portion' or '~er' used hereafter indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may transmit and receive signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal.

Also, the wireless communication unit 210 up-converts the baseband signal to a radio frequency (RF) band signal, transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and the like. In addition, the wireless communication unit 210 may include a plurality of transmit and receive paths. Further, the wireless communication unit 210 may include at least one antenna array including a plurality of antenna elements.

In view of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As such, the wireless communication unit 210 transmits and receives the signals. Hence, whole or part of the wireless communication unit 210 may be referred to as a transmitter, a receiver, or a transceiver. In the following, the transmission and the reception over the radio channel embrace the above-stated processing of the wireless communication unit 210.

The backhaul communication unit 220 provides an interface for communicating with other nodes in the network. That is, the backhaul communication unit 220 converts a bit sting transmitted from the base station to another node, for example, to another access node, another base station, an upper node, or a core network, to a physical signal, and converts a physical signal received from the other node to a bit string.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data in response to a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. According to other embodiment, the protocol stack may be included in the wireless communication unit 210. For doing so, the control unit 240 may include at least one processor. According to various embodiments, the control unit 240 may control to perform synchronization using a wireless communication network. For example, the control unit 240 may control the base station to carry out operations to be explained according to various embodiments.

Figure 3:
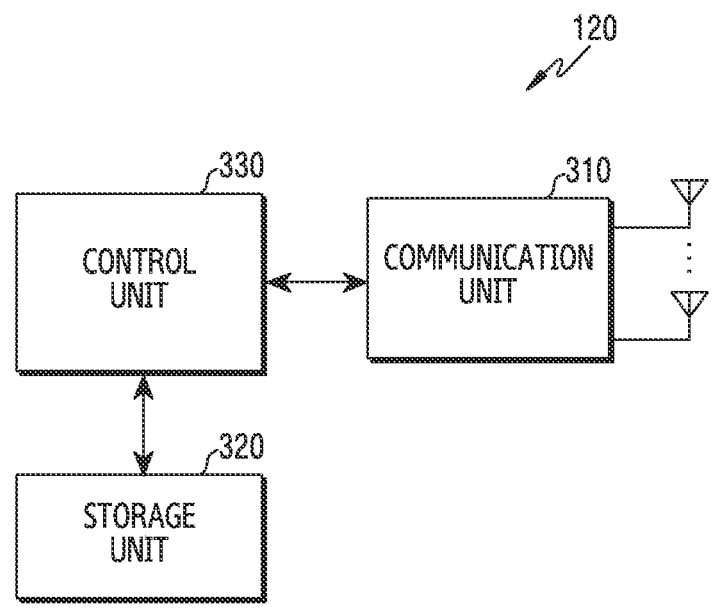
FIG. 3 illustrates a configuration of a terminal in a wireless communication system according to an embodiment of the disclosure.

FIG. 3 illustrates a configuration of a terminal in a wireless communication system according to embodiment of the disclosure. The configuration of FIG. 3 may be understood as the configuration of the terminal 120. A term such as 'portion' or '~er' indicates a unit for processing at least one function or operation, and may be implemented using hardware, software, or a combination of hardware and software.

Referring to FIG. 3, the terminal includes a communication unit 310, a storage unit 320, and a control unit 330.

The communication unit 310 may transmit and receive signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In view of the hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform beamforming As such, the communication unit 310 transmits and receives the signals. Hence, whole or part of the communication unit 310 may be referred to as a transmitter, a receiver, or a transceiver. Hereafter, the transmission and the reception over the radio channel embrace the above-stated processing of the communication unit 310.

The storage unit 320 stores a basic program for operating the terminal, an application program, and data such as setting information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the terminal. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. Part of the communication unit 310 and the control unit 330 may be referred to as a communication processor (CP). According to various embodiments, the control unit 330 may control to perform synchronization using a wireless communication network. For example, the control unit 330 may control the terminal to carry out operations, to be explained, according to various embodiments.

Figure 4:
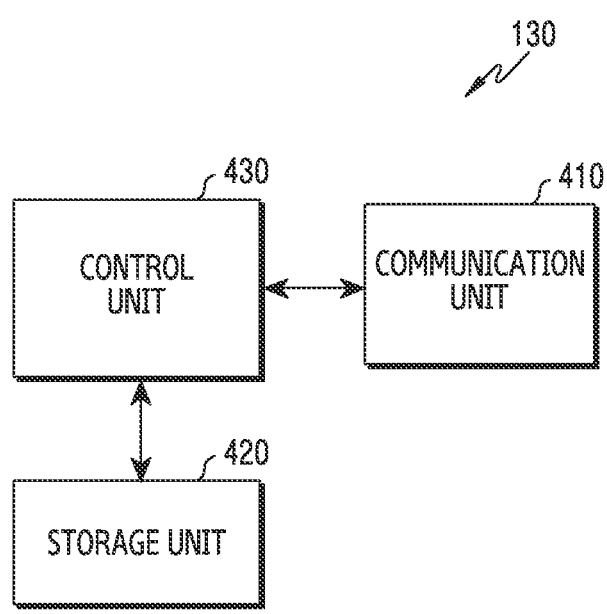
FIG. 4 illustrates a configuration of a core network entity in a wireless communication system according to an embodiment of the disclosure.

FIG. 4 illustrates a configuration 130 of a core network entity in a wireless communication system according to embodiment of the disclosure. The configuration of FIG. 4 may be understood as the configuration of the device having at least one function 130a through 13h of FIG. 1. A term such as 'portion' or '~er' indicates a unit for processing at least one function or operation, and may be implemented using hardware, software, or a combination of hardware and software.

Referring to FIG. 4, the core network entity includes a communication unit 410, a storage unit 420, and a control unit 430.

The communication unit 410 provides an interface for communicating with other devices in the network. That is, the communication unit 410 converts a bit sting transmitted from the core network entity to another device, and converts a physical signal received from the other device to a bit string. That is, the communication unit 410 may transmit and receive signals. Hence, the communication unit 410 may be referred to as a modem, a transmitter, a receiver or a transceiver. The communication unit 410 enables the core network entity to communicate with other devices or system via a backhaul connection (e.g., wired backhaul or wireless backhaul)

The storage unit 420 stores a basic program for operating the core network entity, an application program, and data such as setting information. The storage unit 420 may include a volatile memory, a non-volatile memory, or a combination of a volatile memory and a non-volatile memory. The storage unit 420 provides the stored data in response to a request of the control unit 430.

The control unit 430 controls general operations of the core network entity. For example, the control unit 430 transmits and receives signals through the communication unit 410. Also, the control unit 430 records and reads data in and from the storage unit 420. For doing so, the control unit 430 may include at least one processor. According to various embodiments, the control unit 430 may control to perform synchronization using a wireless communication network. For example, the control unit 430 may control the core network entity to carry out operations to be explained according to various embodiments.

Figure 5:
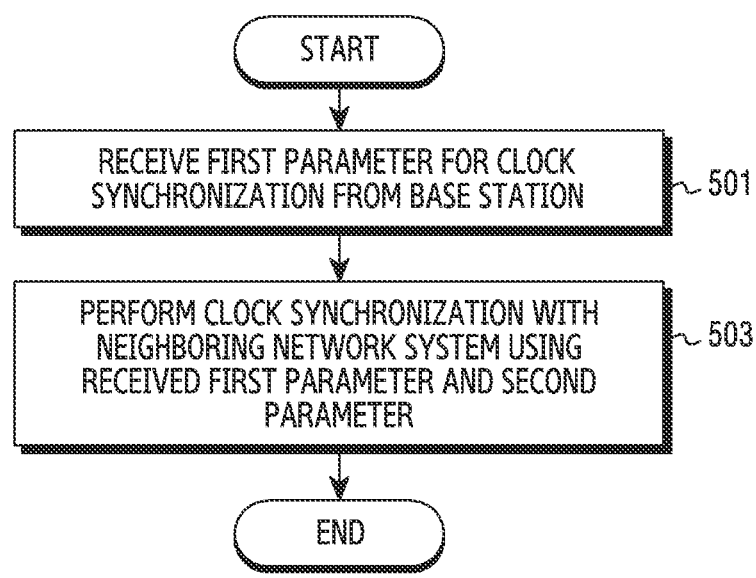
FIG. 5 illustrates a flowchart of a user plane function (UPF) in a wireless communication system according to an embodiment of the disclosure.

FIG. 5 illustrates a flowchart of a UPF in a wireless communication system according to an embodiment of the disclosure. FIG. 5 illustrates an operating method of the UPF 130*c* in an uplink.

Referring to FIG. 5, in operation 501, the UPF may receive a first parameter for clock synchronization from a base station. In so doing, the first parameter may include a delay time of a link 1 (delay link 1, D_Link1) between a master of a TSN system and a network including a terminal, the base station, and the UPF, a frame residence time in UE (R_UE), air delay (D_Air) between the terminal and the base station, and a frame residence time in gNB (R_gNB).

In operation 503, the UPF may perform the clock synchronization with a neighboring network system using the received first parameter and a second parameter. In so doing, the second parameter may include a BH delay (D_BH) between the base station and the UPF, and a frame residence time in UPF (R_RPF). Herein, the backhaul delay may be predetermined and stored in the UPF. The UPF may conduct the clock synchronization with the TSN system by applying the first parameter and the second parameter to a correction field for the clock synchronization.

Figure 6:
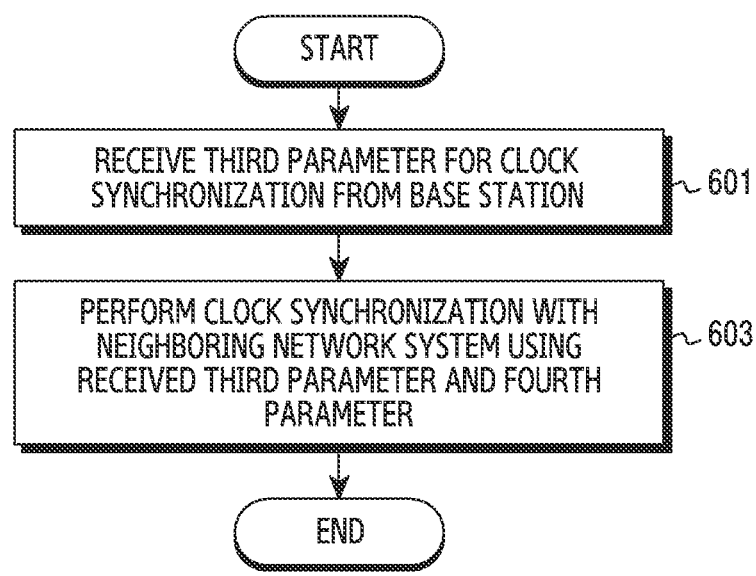
FIG. 6 illustrates a flowchart of a terminal in a wireless communication system according to an embodiment of the disclosure.

FIG. 6 illustrates a flowchart of a terminal in a wireless communication system according to an embodiment of the disclosure. FIG. 6 illustrates an operating method of the terminal 120 in a downlink.

Referring to FIG. 6, in operation 601, the terminal may receive a third parameter for clock synchronization from a base station. In so doing, the third parameter may include a delay time of a link 2 (delay link 2, D_Link2) between a TSN switch and a network including a terminal, the base station, and a UPF, a residence time in core network (R_CN), and a residence time in RAN (R_RAN).

In operation 603, the UPF may perform the clock synchronization with a neighboring network system using the received third parameter and a fourth parameter. In so doing, the fourth parameter may include a frame residence time in the terminal, and a delay time of a link 3 (delay link 3, D_Link3) between a slave of the TSN system and the network including the terminal, the base station, and the UPF. The terminal may perform the clock synchronization with the TSN system by applying the third parameter and the fourth parameter to a correction field for the clock synchronization.

In general, a clock synchronization process in a network (NW) supporting 802.1AS is identical to a clock synchronization process of institute of electrical and electronics engineers (IEEE) 1588 in basic principles, but is different in procedure. For example, a periodic link delay time measurement process between two neighboring TSN systems (e.g., end-station or bridge), and an update procedure of the correction field including the residence time of the bridge may be included in the above-stated different process. In various embodiments, an end-station may indicate a node which may serve as a master or a slave. Now, FIG. 7 and FIG. 8 provide a specific operating method of the above-stated processes.

Figure 7:
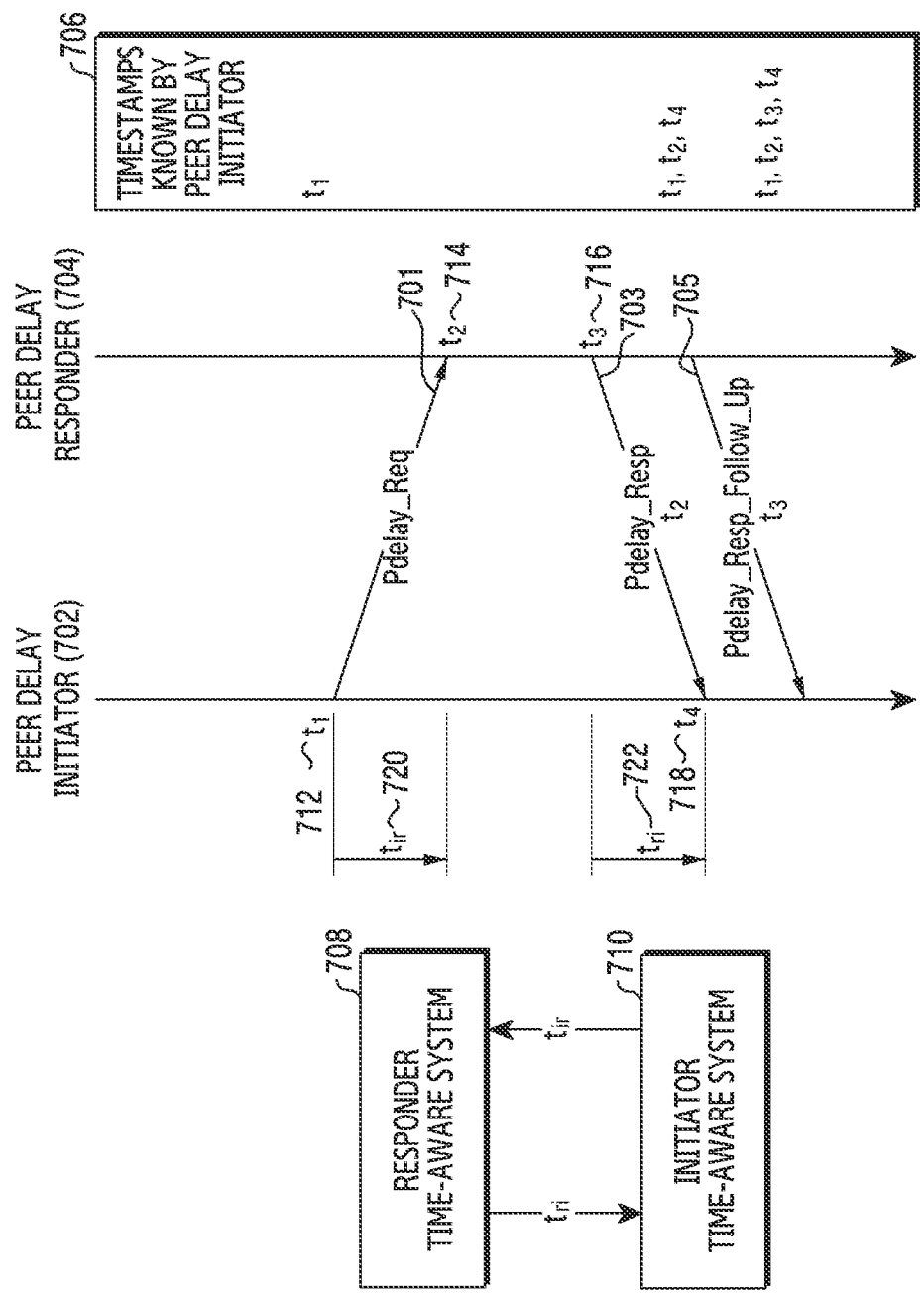
FIG. 7 illustrates a method for measuring a delay time between neighboring time sensitive network (TSN) systems in a wireless communication system according to an embodiment of the disclosure.
Figure 8:
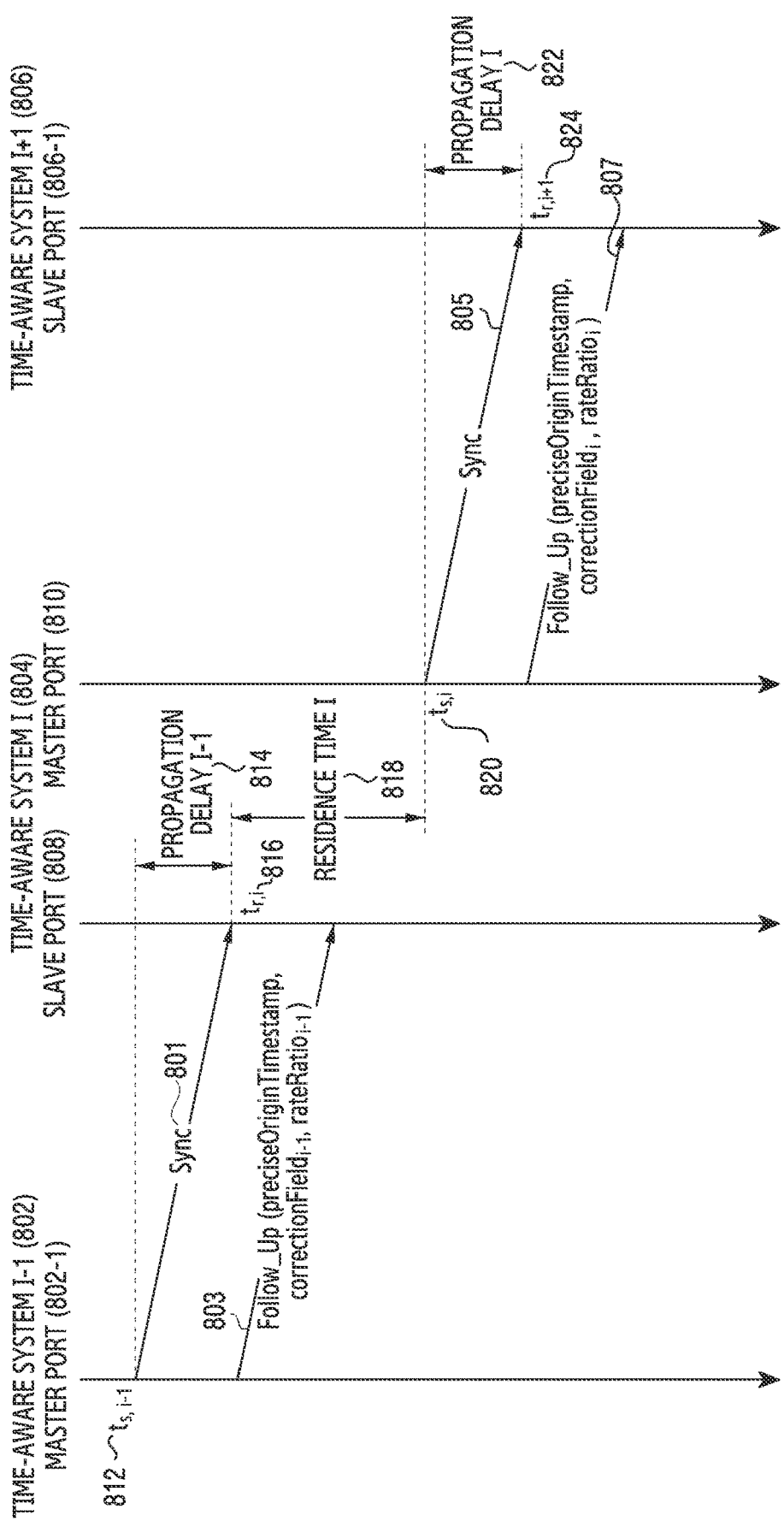
FIG. 8 illustrates a clock synchronization method between TSN systems in a wireless communication system according to an embodiment of the disclosure.

FIG. 7 illustrates a method for measuring a delay time between neighboring TSN systems in a wireless communication system according to an embodiment of the disclosure.

Referring to FIG. 7, a peer delay initiator 702 requests delay time measurement, and a peer delay responder 704 receives the delay time measurement request. In various embodiments, the peer delay initiator may indicate a node which requests the delay time measurement, and the peer delay responder may indicate a node which receives the delay time measurement request. The peer delay initiator and the peer delay responder may indicate different TSN systems. For example, the peer delay initiator and the peer delay responder may indicate a bridge and a bridge, a bridge and a master, and a bridge and a slave respectively.

In operation 701, the peer delay initiator 702 may transmit to the peer delay responder 704 at a time $t_1$ 712, a Pdelay_Req Ethernet frame for requesting the delay time measurement from the peer delay responder 704. The peer delay responder 704 may receive the Pdelay_Req Ethernet frame at a time $t_2$ 714, and store the frame reception time $t_2$ 714. In various embodiments, a time $t_{ir}$ 720 may indicate a difference of the time $t_1$ 712 and the time $t_2$ 714.

In operation 703, the peer delay responder 704 may transmit to the peer delay initiator 702 at a time $t_3$ 716, a Pdelay_Resp Ethernet frame including information of the stored time $t_2$ 714. Next, the peer delay responder 704 may store the transmission time $t_3$ 716 of the Pdelay_Resp Ethernet frame.

In operation 705, the peer delay responder 704 may transmit to the peer delay initiator 702 a Pdelay_Resp_Follow_Up Ethernet frame including information of the stored time $t_3$ 716. The peer delay initiator 702 may receive the Pdelay_Resp Ethernet frame at a time $t_4$ 718. Next, the peer delay initiator 702 may receive the Pdelay_Resp_Follow_Up Ethernet frame. By identifying the Pdelay_Resp Ethernet frame and the Pdelay_Resp_Follow_Up Ethernet frame, the peer delay initiator 702 may obtain the time $t_2$ 714 and the time $t_3$ 716. The peer delay initiator 702 may determine a delay time D between neighboring TSN systems, using the above time $t_1$ 712, time $t_2$ 714, time $t_3$ 716, and time $t_4$ 718. The delay time D between the neighboring TSN systems may be defined based on Equation 1.

$$D=((t_2-t_1)+(t_4-t_3))/2 \qquad \text{Equation 1}$$

In Equation 1, D may denote the delay time between the neighboring TSN systems, $t_1$ may denote the time at which the peer delay initiator 702 requests the delay time measurement from the peer delay responder 704, $t_2$ may denote the time at which the peer delay responder 704 receives the Pdelay_Req Ethernet frame from the peer delay initiator 702, $t_3$ may denote the time at which the peer delay responder 704 transmits the Pdelay_Resp Ethernet frame to the peer delay initiator 702, and $t_4$ may denote the time at which the peer delay initiator 702 receives the Pdelay_Resp Ethernet frame from the peer delay responder 704. In various embodiments, a time $t_{ri}$ 722 may denote a difference of the time $t_3$ 716 and the time $t_4$ 718. In various embodiments, the delay time between the neighboring TSN systems may be determined to a mean value of the time $t_{ir}$ 720 and the time $t_{ri}$ 722, wherein the mean value of the time $t_{ir}$ 720 and the time $t_{ri}$ 722 may be expressed as a mean path delay meanPathDelay. In various embodiments, if an initiator time-aware system 710 transmits a signal to a responder time-aware system 708, the delay corresponding to the time $t_{i,r}$ 720 may occur. If the responder time-aware system 708 transmits a signal to the initiator time-aware system 710, the delay corresponding to the time $t_{r,i}$ 722 may occur. In various embodiments, the time $t_{i,r}$ 720 may be determined by a difference of the mean path delay and a delay asymmetry value (meanPathDelay+delayAsymmetry). The time $t_{r,i}$ 722 may be determined by a sum of the mean path delay and the delay asymmetry value (meanPathDelay+delayAsymmetry). In various embodiments, the peer delay responder 704 may store timestamps 706 known by the peer delay initiator 702. For example, the timestamps 706 known by the peer delay initiator 702 may include $t_1$, $t_1$, $t_2$, and $t_4$, and $t_1$, $t_2$, $t_3$, and $t_4$. In various embodiments, the delay time between the neighboring TSN systems may be periodically calculated at predetermined intervals. The periodic delay time calculation may be calculated with neighborRateRatio between the TSN systems. For example, the neighborRateRatio may be determined based on a ratio (local clock frequency i/local clock frequency r) of a local clock frequency i of the peer delay initiator 702 and a local clock frequency r of the peer delay responder 704. In various embodiments, the local clock frequency may indicate a natural oscillation frequency of a corresponding TSN system, an inverse value of the period, and so on.

FIG. 8 illustrates a clock synchronization method between TSN systems in a wireless communication system according to an embodiment of the disclosure.

Referring to FIG. 8, a time-aware system may indicate a TSN system. In operation 801, a master port 802-1 of a time-aware system i−1 802 may transmit a Sync frame to a slave port 808 of a time-aware system i 804 at a time $t_{s,i-1}$ 812. The slave port 808 may receive the Sync frame at a time to 816. A difference of the time $t_{s,i-1}$ 812 and the time $t_{r,i}$ 816 may indicate a propagation delay i−1 814 between the TSN system i−1 802 and the TSN system i 804.

In operation 803, the master port 802-1 of the time-aware system i−1 1802 may transmit a Follow_Up frame to the slave port 808 of a time-aware system I 804. The Follow_Up frame may include parameters preciseOriginTimestamp, correctionField$_{i-1}$ and rateRatio$_{i-1}$. preciseOriginTimestamp may denote a time at which a grandmaster of a TSN domain transmits the Sync frame. correctionField$_{i-1}$ may denote a value reflecting a difference of preciseOriginTimestamp and the Sync frame transmission time of the time-aware system i−1 802. rateRatio$_{i-1}$ denotes a ratio of a clock frequency of the grandmaster and a clock frequency of the TSN system i−1 802, and may be calculated as (Grandmaster Clock Frequency)/(Local Clock Frequency i−1). In various embodiments, the grandmaster may indicate a master node which initially transmits the Sync frame for the clock synchronization in the TSN system.

In operation 805, a master port 810 of the time-aware system i 804 may transmit a Sync frame to a slave port 806-1 of a time-aware system i+1 806 at a time to 820. The slave port 806-1 may receive the Sync frame at a time $t_{r,i+1}$ 824. At this time, a difference of the time to 820 and the time $t_{r,i+1}$ 824 may indicate a propagation delay i 822 of the TSN system i 804 and the TSN system i+1 806.

In operation 807, the master port 810 of the time-aware system i 804 may transmit a Follow_Up frame to the slave port 806-1 of a time-aware system i+1 806. The Follow_Up frame may include parameters preciseOriginTimestamp, correctionField$_{i-1}$ and rateRatio$_i$. correctionField$_i$ and rateRatio$_i$ may be calculated by the time-aware system i 804. correctionField$_i$ may be calculated as correctionField$_i$=correctionField$_{i-1}$+LinkDelay$_{i-1}$+ResidenceTime$_i$. LinkDelay$_{i-1}$ denotes the delay time D between the TSN systems as described in FIG. 7, and may be periodically calculated at predetermined intervals and stored as a mean value. LinkDelay$_{i-1}$ may indicate a propagation delay i−1. In various embodiments, a residence time i 818 may indicate a residence time in the TSN system i 804, and may indicate a difference of the time to 816 at which the TSN system i 804 receives the Sync frame and the time to 820 at which the TSN system i 804 transmits the Sync frame to the TSN system i+1 806. rateRatio$_i$ indicates a ratio of local clock frequencies of the TSN system i 804 and the TSN system i+1 806, and may be calculated as rateRatio$_i$=rateRatio$_{i-1}$Δ(Local Clock Frequency$_{i-1}$)/(Local Clock Frequency$_i$). (Local Clock Frequency$_{i-1}$)/(Local Clock Frequency$_i$) may be calculated as neighborRateRatio in the periodic delay time measurement of FIG. 7 and updated continually. In general, in Ethernet local area network (LAN) construction, a link delay value is hundreds of ns, rateRatio is a value close to 1, the residence time is allowed up to 10 ms, and accordingly precise transport of the residence time value is most important to the TSN system. In various embodiments, rateRatio may be a value having the difference below 200 bpm based on 1.

Figure 9:
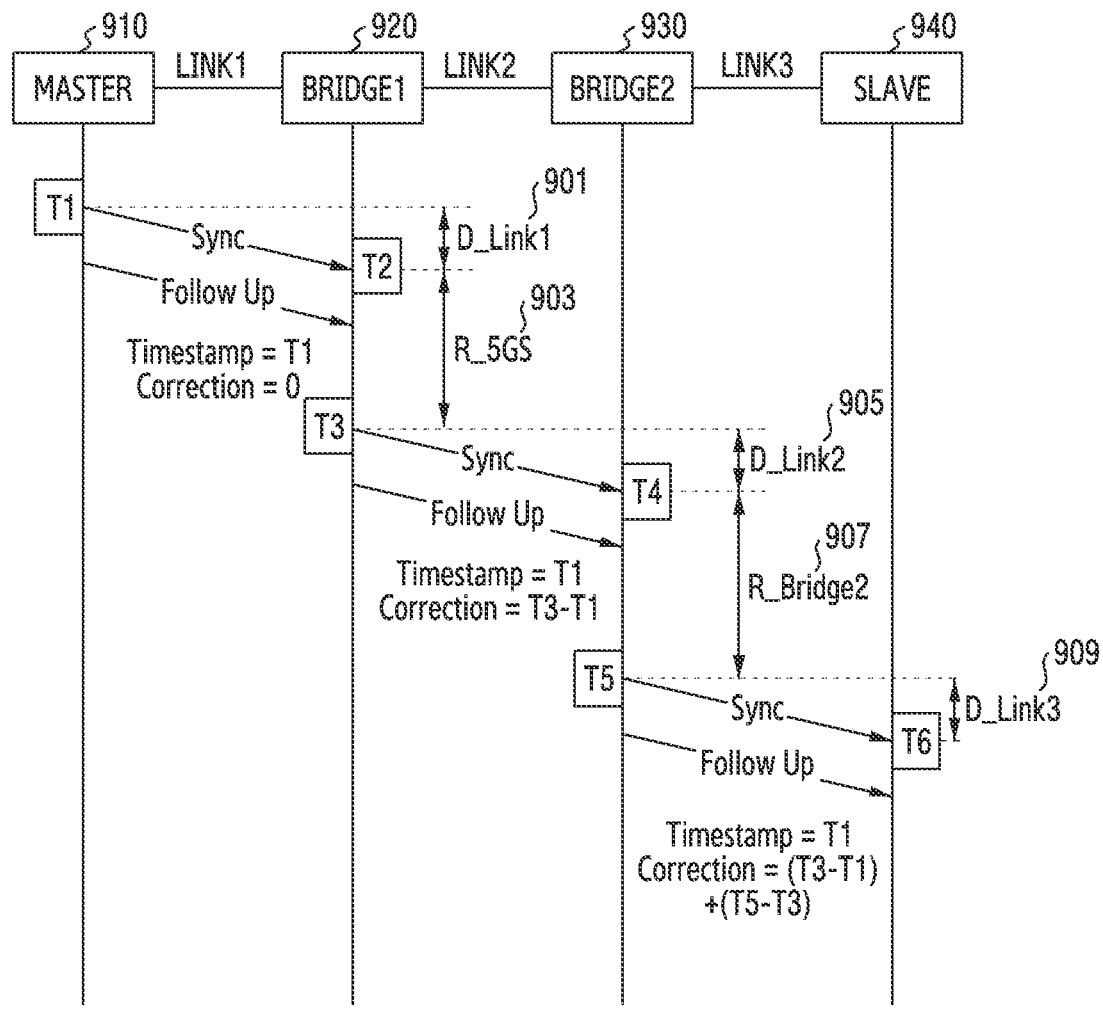
FIG. 9 illustrates a clock synchronization method of a network which supports a first network system according to an embodiment of the disclosure.

FIG. 9 illustrates a clock synchronization method of a network which supports a first network system according to an embodiment of the disclosure.

Referring to FIG. 9, a first network system may include IEEE 802.1AS. In FIG. 9, a master 910 may transmit a Sync frame, and then transmit a Follow_Up frame. In so doing, the time at which the master 910 transmits the Sync frame may be set to T1 and may be set as preciseOriginTimestamp in timestamps, and a correction value of a correction field may be set to 0. In FIG. 9, a delay D_Link1 901 of a link 1 denotes a propagation delay of the link 1 between the master 910 and a first bridge 920, a delay D_Link2 905 of a link 2 denotes a propagation delay of a the link 2 between the first bridge 920 and a second bridge 930, and a delay D_Link3 909 of a link 3 denotes a propagation delay of a link 3 between the second bridge 930 and a slave 940. D_Link1 901, D_Link2 905, and D_Link3 909 may be periodically measured between neighboring nodes and stored as a mean value. A residence time R_Bridge1 903 of the first bridge and a residence time R_Bridge2 907 of the second bridge are residence time of the frame in the corresponding bridge, and may be calculated in real time for each Sync frame and stored in the Follow_Up frame.

Figure 10:
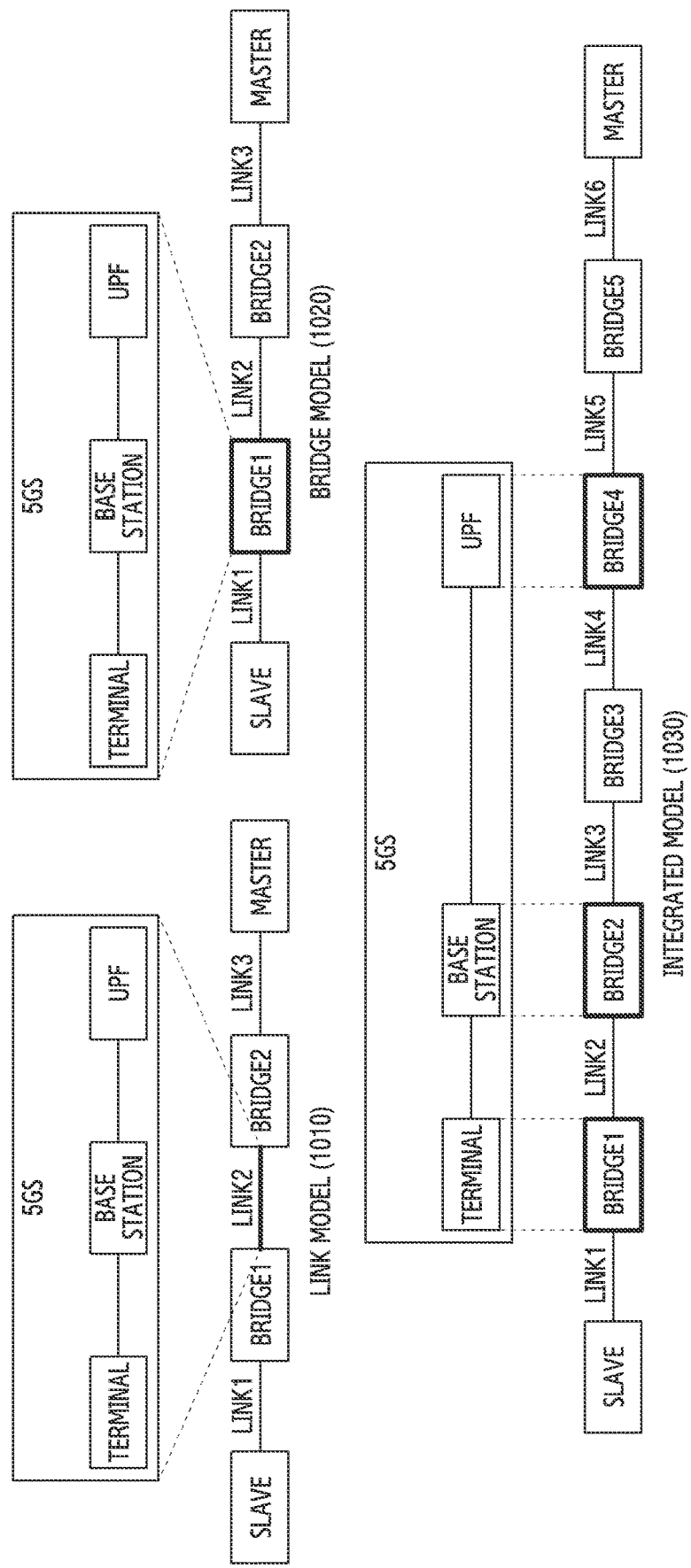
FIG. 10 illustrates an example of a method for supporting a TSN by interworking a network supporting a first network system and a network supporting a second network system according to an embodiment of the disclosure.

FIG. 10 illustrates an example of a method for supporting a TSN by interworking a network supporting a first network system and a network supporting a second network system according to an embodiment of the disclosure.

Referring to FIG. 10, a first network system may include IEEE 802.1AS, and a second network system may include 3GPP. That is, FIG. 10 classifies methods for supporting the TSN by interworking the network supporting IEEE 802.1AS and the network supporting the 3GPP. For example, firstly, a link model 1010 may set 5GS as a link of the TSN. Secondly, a bridge model 1020 may set the 5GS as a bridge of the TSN. Thirdly, an integrated model 1030 may set components of the 5GS as an end-station or a bridge of the TSN system. The 5GS may indicate a network system including a terminal, a base station, and a UPF.

Figure 11:
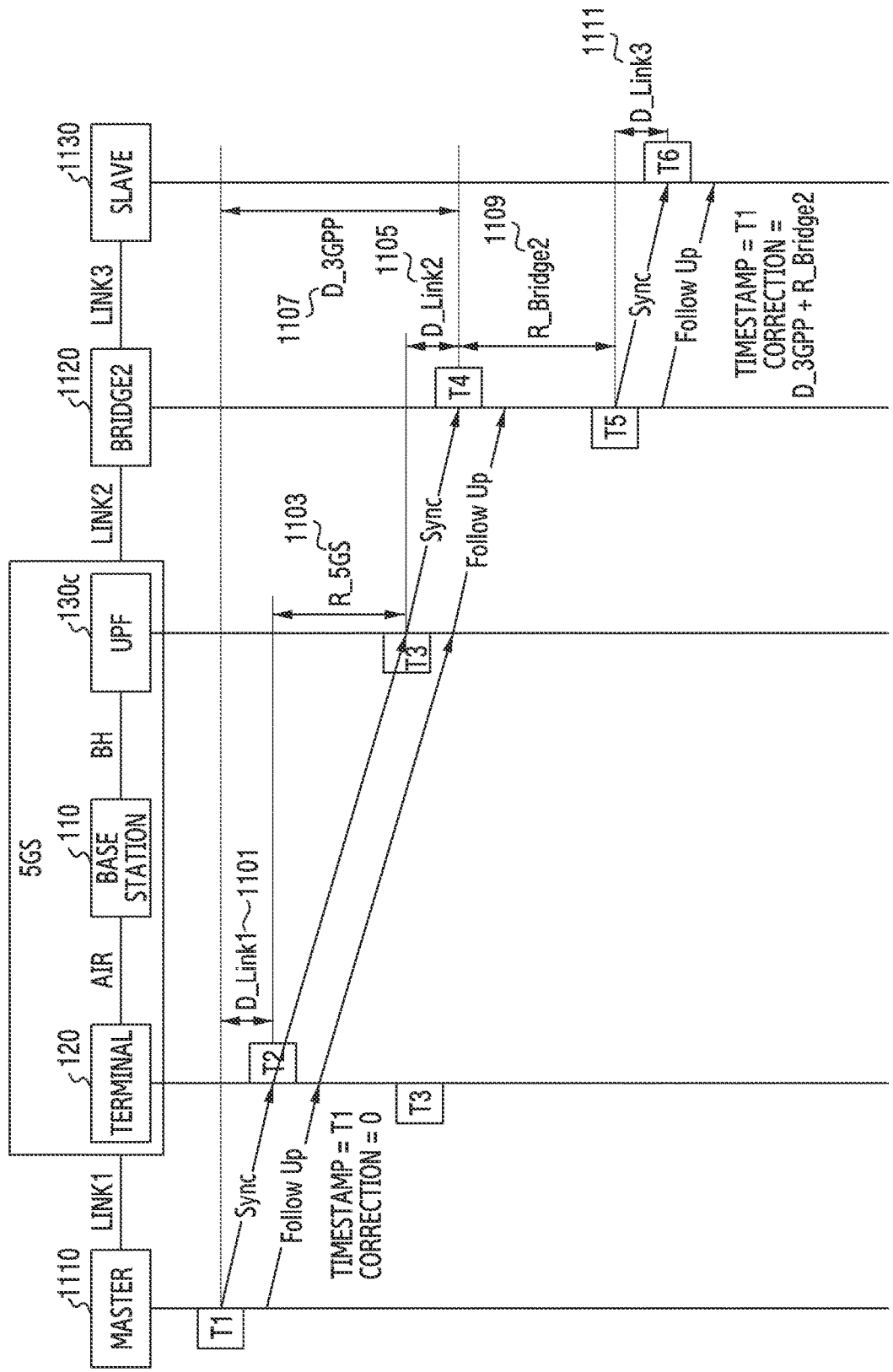
FIG. 11 illustrates an example of clock synchronization of a link model, if a second network system is a link of a TSN according to an embodiment of the disclosure.

FIG. 11 illustrates an example of clock synchronization of a link model, if a second network system is a link of a TSN according to an embodiment of the disclosure.

Referring to FIG. 11, a second network system may include 5GS. That is, FIG. 11 illustrates the example of the clock synchronization of the link model, if the 5GS is set as the link of the TSN. In FIG. 11, the 5GS which is a network system including a terminal 120, a base station 110, and a UPF 130c may be set as a link between a master (or a grandmaster) 1110 and a second bridge 1120 of two neighboring TSN systems. At this time, the 5GS may have a delay time D_3GPP 1107. The master 1110 and the second bridge 1120 which are the two neighboring TSN systems may periodically measure, store and use the delay time D_3GPP 1107 as a mean value. At this time, accuracy of the delay time D_3GPP 1107 may increase if a variance of the delay time is smaller than a threshold and there is no difference in direction. In addition, if the residence time in the terminal 120, the base station 110, and the UPF 130c of the 5GS domain are constant and the direction is symmetric, and air delay and BH delay are constant and symmetric in the direction, the accuracy of the delay time may be regarded as high. To provide the constant and symmetric delay time, a special quality of service (QoS) class for the 5GS is required. In FIG. 11, a delay D_Link1 1101 of a link 1 may indicate a propagation delay between the master 1110 and the 5GS, a residence time R_5GS 1103 of the 5GS may indicate a residence time in the 5GS including the terminal 120, the base station 110, and the UPF 130c, a delay D_Link2 1105 of a link 2 may indicate a propagation delay between the 5GS and a second bridge 1120, a residence time R_Bridge2 1109 of the second bridge may indicate a residence time of the frame in the second bridge 1120, and a delay D_Link3 1111 of a link 3 may indicate a propagation delay between the second bridge 1120 and a slave 1130. Now, FIG. 12 illustrates a process for providing the QoS class to the 5GS to provide a symmetric and constant delay time.

Figure 12:
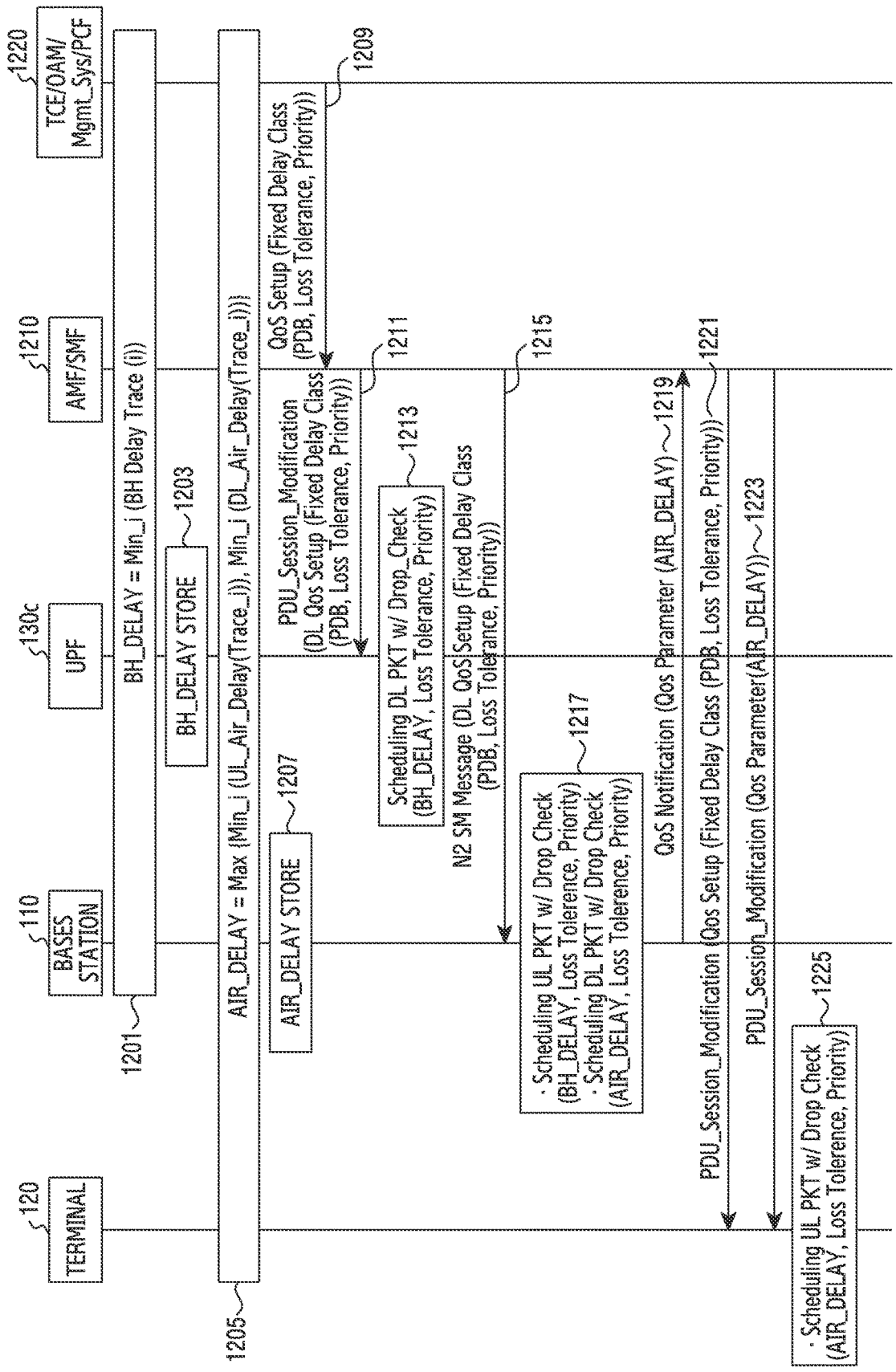
FIG. 12 illustrates a method for providing a quality of service (QoS) class in a second network system according to an embodiment of the disclosure.

FIG. 12 illustrates a method for providing a QoS class in a second network system according to an embodiment of the disclosure.

Referring to FIG. 12, the QoS may be applied to an Ethernet frame relating to delay time measurement and clock synchronization. In operation 1201, a base station 110, a UPF 130c, an AMF/SMF 1210 and a TCE/OAM/Mgmt_Sys/PCF 1220 may determine a BH delay value BH_DELAY which is a target delay time value, with a minimum value of values measured through BH delay trace.

In operation 1203, the UPF 130c may store the determined BH delay value BH_DELAY. Although not depicted in FIG. 12, the UPF 130c may report the stored BH delay value BH_DELAY to a management system (Mgmt_Sys) of the TCE/OAM/Mgmt_Sys/PCF 1220.

In operation 1205, a terminal 120, the base station 110, the UPF 130c, the AMF/SMF 1210, and the TCE/OAM/Mgmt_Sys/PCF 1220 may determine an air delay value AIR_DELAY. For example, the air delay value may be determined to a greater value of an uplink air delay value and a downlink air delay value.

In operation 1207, the base station 110 may store the determined air delay value AIR_DELAY. Although not depicted in FIG. 12, the base station 110 may report the stored air delay value AIR_DELAY to the management system of the TCE/OAM/Mgmt_Sys/PCF 1220.

In operation 1209, the management system of the TCE/OAM/Mgmt_Sys/PCF 1220 may request QoS Setup of a fixed delay class from the SMF 130b of the AMF/SMF 1210 via the PCF 130d. A QoS setup request message may include parameters indicative of packet delay budget (PDB), loss tolerance, and priority.

In operation 1211, the SMF 130b of the AMF/SMF 1210 may transmit a message for requesting protocol data unit (PDU) session modification PDU_Session_Modification to the UPF 130c. The session modification request message may include the parameters indicative of the PDB, the loss tolerance, and the priority.

In operation 1213, the UPF 130c may schedule a downlink packet (PKT). For example, if receiving the PDU session modification message, the UPF 130c may calculate a residence time of the downlink packet in the UPF 130c by considering the stored BH delay value, and perform scheduling by considering the priority of the downlink packet. If not scheduling based on the stored BH delay value, the UPF 130c may drop the downlink packet to make loss of a consecutive downlink packet fall below the loss tolerance. If the loss of the consecutive downlink packet exceeds the loss tolerance, the UPF 130c may reschedule the downlink packet by increasing the priority. Such scheduling prevents worse outcome than no packet transport, if the downlink packet does not arrive within the delay time. The loss tolerance may be determined based on a TSN environment. In various embodiments, uplink packet transmission may not be fulfilled merely by providing the QoS of the 5GS, and an uplink packet may be scheduled based on the priority.

In operation 1215, the SMF 130b of the AMF/SMF 1210 may transmit an N2 session modification (SM) message to the base station 110. The N2 SM message is to schedule an uplink packet.

In operation 1217, the base station 110 receiving the N2 SM message may schedule an uplink packet by considering the BH delay value. If not scheduling the uplink packet based on the stored BH delay value, the base station 110 may drop the uplink packet to make loss of a consecutive uplink packet fall below the loss tolerance. If the loss of the consecutive uplink packet exceeds the loss tolerance, the base station 110 may reschedule the uplink packet by increasing the priority. If scheduling a downlink packet, the base station 110 may schedule the downlink packet by considering the air delay value AIR_DELAY. If not scheduling the downlink packet based on the stored air delay value, the base station 110 may drop the downlink packet to make loss of a consecutive downlink packet fall below the loss tolerance. If the loss of the consecutive downlink packet exceeds the loss tolerance, the base station 110 may reschedule the downlink packet by increasing the priority. In various embodiments, the base station 110, which stores the air delay value, may calculate the BH delay value using a difference PDB-AIR_DELAY of PDB and the air delay value.

In operation 1219, the base station 110 may perform QoS setup of a fixed delay class, and then transmit a QoS notification message to the SMF 130b of the AMF/SMF 1210. The QoS notification message may include a parameter relating to the air delay value. The air delay value in the QoS message may be transmitted to the terminal 120 and used for uplink QoS setup of the terminal 120.

In operation 1221, the SMF 130b of the AMF/SMF 1210 may transmit a PDU session modification message to the terminal 120. The PDU session modification message may include parameters of the PDB, the loss tolerance, and the priority.

In operation 1223, the SMF 130b of the AMF/SMF 1210 may transmit a PDU session modification message to the terminal 120. The PDU session modification message may include a parameter of the air delay value.

In operation 1225, the terminal 120 may schedule an uplink packet by considering the air delay value of the PDU session modification message. If not scheduling the uplink packet based on the air delay value, the terminal 120 may drop the uplink packet to make loss of a consecutive uplink packet fall below the loss tolerance. If the loss of the consecutive uplink packet exceeds the loss tolerance, the terminal 120 may reschedule the uplink packet by increasing the priority. In various embodiments, operations 1211, 1215, and 1221 may be conducted regardless of order. Now, FIG. 13 and FIG. 14 illustrate calculating the BH delay value and the air delay value respectively.

Figure 13:
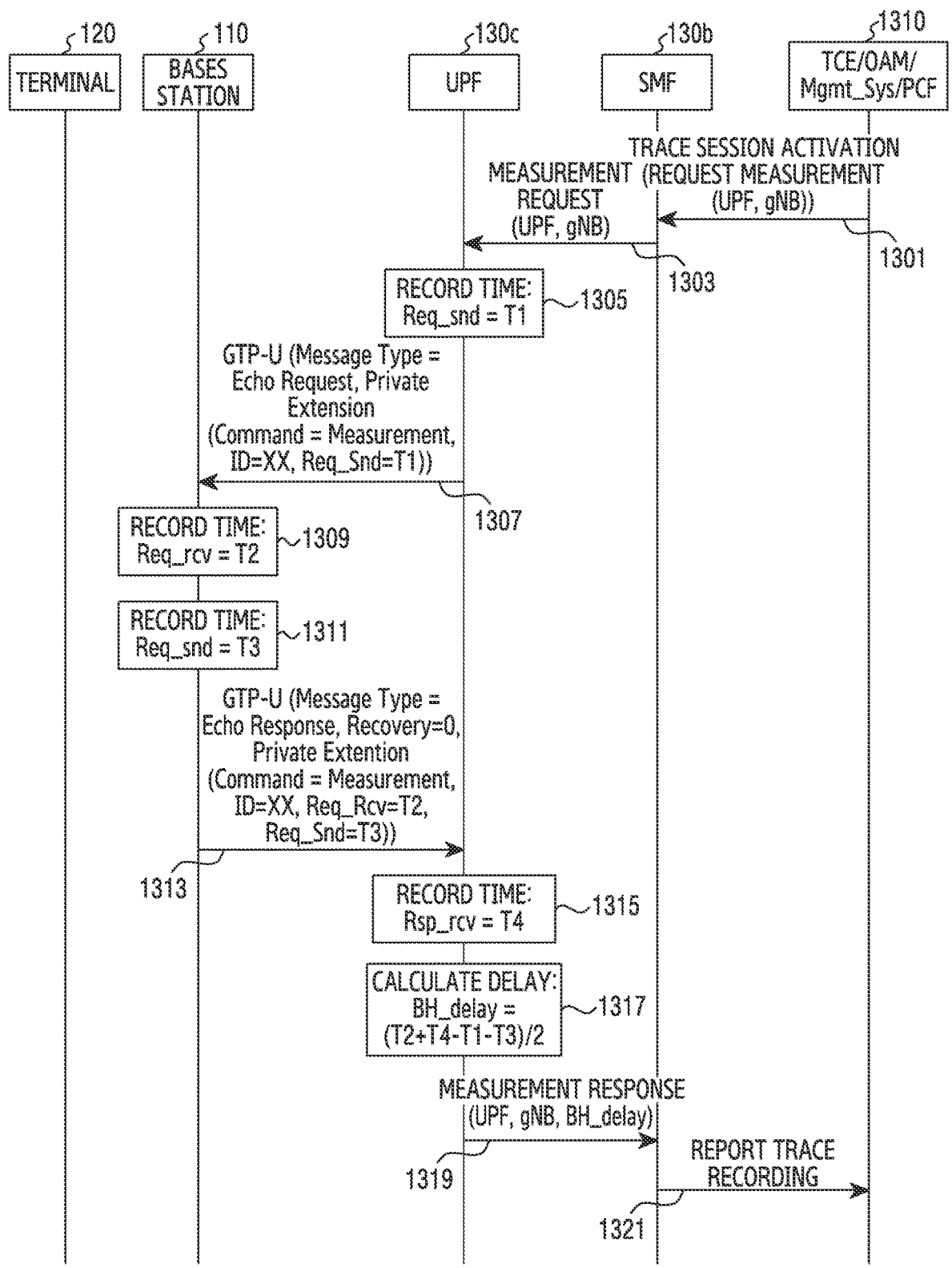
FIG. 13 illustrates a backhaul (BH) delay trace method according to an embodiment of the disclosure.
Figure 14:
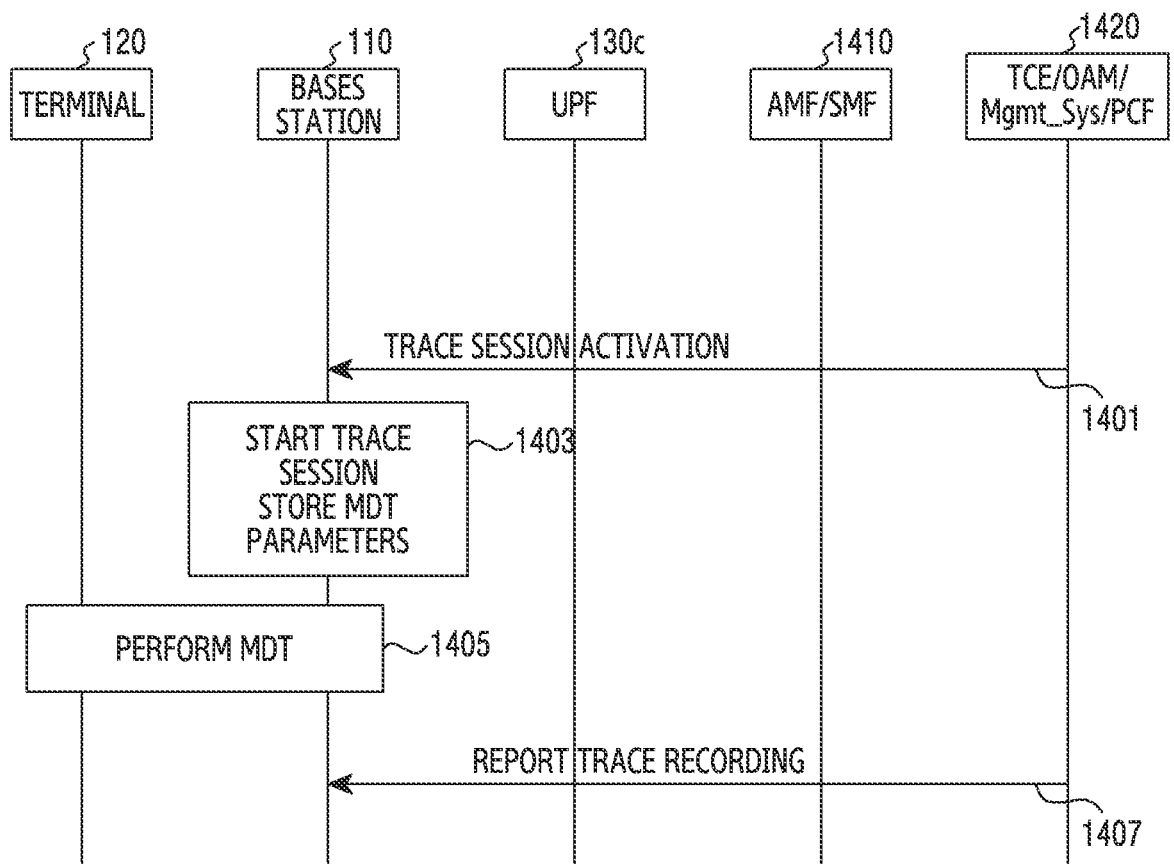
FIG. 14 illustrates an air delay trace method according to an embodiment of the disclosure.

FIG. 13 illustrates a BH delay trace method according to an embodiment of the disclosure.

Referring to FIG. 13, in operation 1301, a management system of a TCE/OAM/Mgmt_Sys/PCF 1310 may transmit a trace session activation message to an SMF 130b. The trace session activation message may include information indicating a UPF 130c and a base station 110.

In operation 1303, the SMF 130b may request the BH delay trace from the UPF 130c, by transmitting a measurement request message indicating the base station 110 which is required by the UPF 130c.

In operation 1305, the UPF 130c may record a time. For example, the UPF 130c may record the time Req_snd at which the measurement request is transmitted from the SMF 130b, as T1. The UPF 130c may measure delay using a general packet radio service (GPRS) tunneling protocol—user plane (GTP-U) message with the base station 110.

In operation 1307, the UPF 130c may transmit the GTP-U message to the base station 110. In so doing, the GTP-U message transmitted by the UPF 130c may include a parameter of echo request and echo response types of existing GTP-U message types. The echo request may be transmitted by including parameters Command=Measurement, ID=XX, and Req_Snd=T1, using a private extension field. Command indicates a purpose of the current echo request message, ID indicates a value for identifying the same Command, and Req_Snd indicates the time of the measurement request transmission.

In operation 1309, the base station 110 may record a time. That is, the base station 110 may set the reception time Req_rcv of the GTP-U message as T2.

In operation 1311, the base station 110 may record a time. That is, the base station 110 may a time Req_snd of transmitting an echo response message which is a response message for the echo request, as T3.

In operation 1313, the base station 110 may transmit the echo response message to the UPF 130c. The echo response message may be transmitted by including parameters Command=Measurement, ID=XX, Req_Rcv=T2, and Rsp_Snd=T3, by using the private extension field. Command indicates a purpose of the current echo response message, and ID indicates a value for identifying the same Command ID may indicate the same value as the ID of the echo request received previously. Req_Rcv may indicate the echo request reception time, and Rsp_Snd may indicate the echo response transmission time.

In operation 1315, the UPF 130c may record a time. That is, the UPF 130c may set the echo response reception time Rsp_rcv from the base station 110, as T4.

In operation 1317, the UPF 130c may calculate a BH delay value using the recorded time values. For example, the UPF 130c may define Equation 2.

BH_delay=(T2+T4−T1−T3)/2   Equation 2

In Equation 2, BH_delay denotes the BH delay, T1 denotes the measurement request transmission time from the SMF 130b to the UPF 130c, T2 denotes the GTP-U message reception time at the base station 110, T3 denotes the transmission time of the echo response message from the base station 110 to the UPF 130c, and T4 denotes the reception time of the echo response message from the base station 110 to the UPF 130c.

In operation 1319, the UPF 130c may transmit a measurement response to the SMF 130b. That is, the UPF 30c may transmit the calculated BH delay value to the SMF 130b. In so doing, the measurement response message transmitted to the SMF 130b may include information relating to the UPF 130c, the base station 110, and the BH delay.

In operation 1321, the SMF 130b may report the trace recording to the management system of the TCE/OAM/Mgmt_Sys/PCF 1310.

FIG. 14 illustrates an air delay trace method according to an embodiment of the disclosure.

Referring to FIG. 14, in operation 1401, a management system of a TCE/OAM/Mgmt_Sys/PCF 1420 may transmit a trace session activation message to a base station 110. The trace session activation message may traverse an AMF/SMF 1410 and a UPF 130c.

In operation 1403, the base station 110 may start a trace session, and store minimization drive test (MDT) parameters. That is, the base station 110 may initiate the session with a corresponding terminal 120 and store necessary parameters.

In operation 1405, the base station 110 may perform existing MDT with the corresponding terminal 120. The base station 110 may store a result. In so doing, the MDT parameters stored in operation 1403 may be used.

In operation 1407, the base station 110 may report a trace recording. That is, the base station 110 may transmit a message including the MDT result to the management system of the TCE/OAM/Mgmt_Sys/PCF 1420. The trace recording report message may traverse the UPF 130c and the AMF/SMF 1410.

Figure 15:
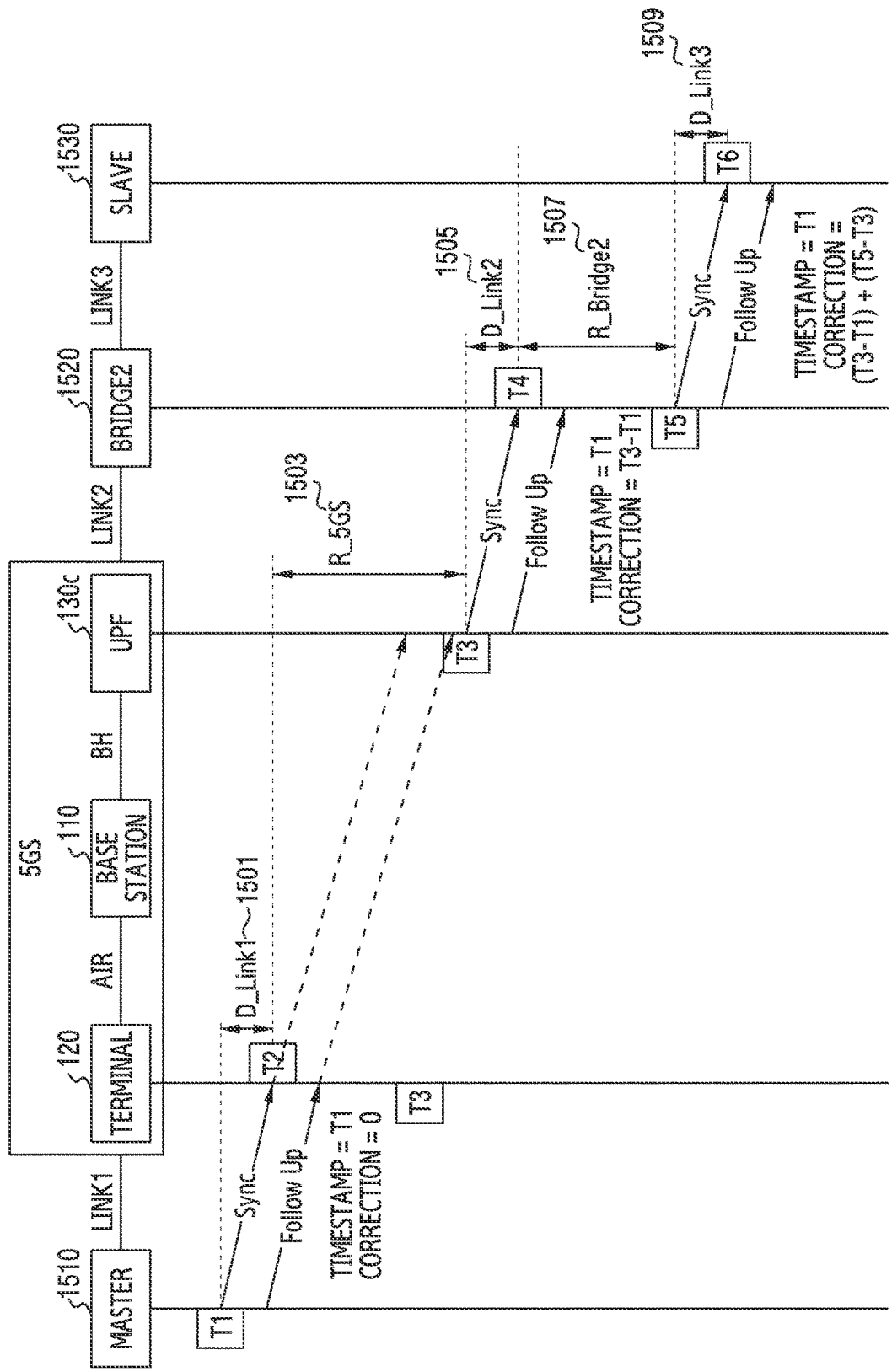
FIG. 15 illustrates an example of a clock synchronization process of a bridge model, if a second network system is a bridge of a TSN according to an embodiment of the disclosure.

FIG. 15 illustrates an example of a clock synchronization process of a bridge model, if a second network system is a bridge of a TSN according to an embodiment of the disclosure.

Referring to FIG. 15, a second network system may include a 5GS. That is, FIG. 5 illustrates the clock synchronization of the bridge model if the 5GS is set to a bridge of the TSN. For example, a terminal 120 and a UPF 130c may perform periodic delay time measurement on a link shared with a neighboring TSN system. In FIG. 15, the terminal 120 may periodically measure a link 1 delay D_Link1 1501 and store its mean value, and the UPF 130c may periodically measure a link 2 delay D_Link2 1505 and store its mean value. In FIG. 15, if transmitting a Sync frame and a Follow_Up frame to a neighboring second bridge 1520, the 5GS including the terminal 120, the base station 110 and the UPF 130c may update link delay and R_5GS 1503 which is a residence time in the 5GS, in a correction field. In so doing, it may be assumed that air delay and BH delay have fixed and symmetric values by applying the fixed delay QoS class of FIG. 12. In various embodiments, the R_5GS 1503 may be calculated by adding the residence time in the terminal 120, the base station 110 and the UPF 130c of the 5GS domain, the air delay, and the BH delay. For example, the 5GS may identify that the correction field value becomes T3−T1 by updating the link 1 delay and the R_5GS 1503 in the correction field of the Sync frame.

In various embodiments, a master 1510 may transmit a Sync frame to the terminal 120 of the 5GS at a time T 1. Next, the master 1510 may transmit a Follow_Up frame. In so doing, the link 1 delay D_Link1 may indicate a difference of the time T1 at which the master 1510 transmits the Sync frame and a time T2 at which the terminal 120 receives the Sync frame. The timestamp may be set to T1, and the correction field may be set to 0. The UPF 130c may transmit a Sync frame to the second bridge 1520 at a time T3. The second bridge 1520 may receive a Sync frame at T4. Next, the UPF 130c may transmit a Follow_Up frame. At this time, a difference of T2 and T3 may indicate R_5GS 1503. A difference of T3 and T4 may indicate the link 2 delay D_Link2, wherein the timestamp may be set to T1 and the correction field may be set to T3−T1. The second bridge 1520 may transmit a Sync frame to a slave 1530 at T5. The slave 1530 may receive the Sync frame at T6. A difference of T4 and T5 may indicate a residence time R_Bridge2 1507 of the second bridge 1520. Next, the second bridge 1520 may transmit a Follow_Up frame. In so doing, a difference of T5 and F6 may indicate link 3 delay D_Link3 1509, wherein the timestamp may be set to T1 and the correction field may be set to (T3−T1)+(T5−T3).

Figure 16:
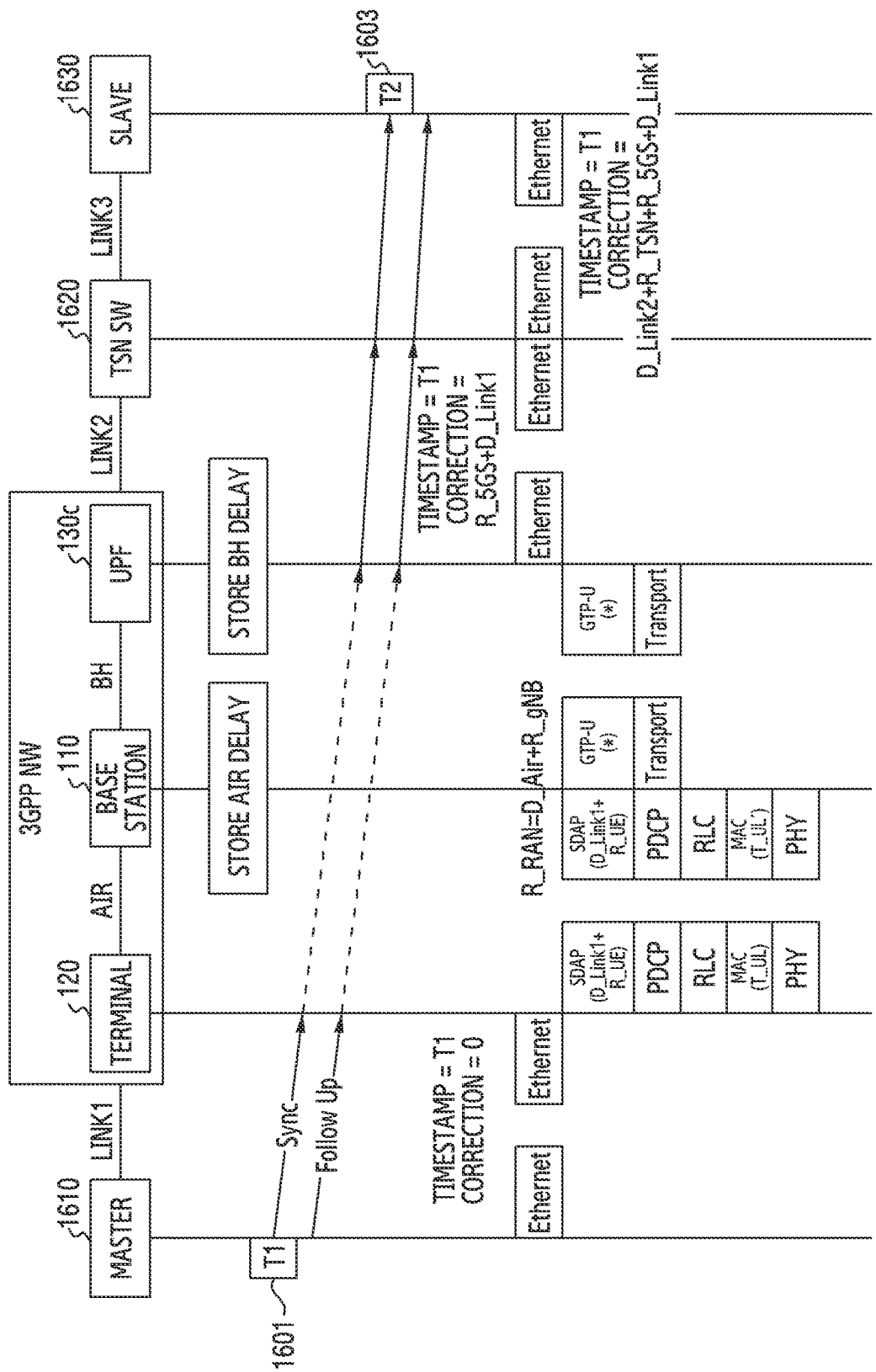
FIG. 16 illustrates a clock synchronization method using uplinks (ULs) of a network supporting a first network system and a bridge model network according to an embodiment of the disclosure.

FIG. 16 illustrates a clock synchronization method using an uplink (UL) of a network supporting a first network system and a bridge model network according to an embodiment of the disclosure.

Referring to FIG. 16, a first network system may include IEEE 802.1AS. That is, FIG. 16 illustrates the clock synchronization using ULs of the network supporting the IEEE 802.1AS and a bridge model 3GPP network. In FIG. 16, R_UE may denote a residence time in a terminal 120, R_UPF may denote a residence time in a UPF 130c, and R_TSN may denote a residence time in a TSN SW 1620. D_Air may denote air delay between the terminal 120 and a base station 110, and D_BH may denote BH delay between the base station 110 and the UPF 130c. The air delay may be pre-stored in the base station 110. The BH delay may be pre-stored in the UPF 130c. A master 1610 may transmit a Sync frame to the terminal 120 at time T1 1601, and then transmit a Follow_Up frame. At this time, the timestamp may be set to T1, and the correction field may be set to 0. To calculate R_5GS, the UPF 130c needs to receive the air delay value, R_UE and R_gNB. Accordingly, the terminal 120 may transmit a service data application protocol (SDAP) including D_Link1 and R_UE to the base station 110. The base station 110 may newly define GTP-U a header and transmit a value D_Link1+R_UE+AIR_DELAY+R_gNB to the UPF 130c. The UPF 130c which stores the BH delay value may calculate R_UPF. Thus, the UPF 130c may calculate R_5GS=R_UE+AIR_DELAY+R_gNB+BH_DELAY+R_UPF, and apply the calculated result value to the correction field of the Follow_Up frame of the Sync frame. The correction field may be calculated by adding the link 1 delay D_Link1 which is the input link of the 5GS and the frame residence time R_5GS in the 5GS to the value transmitted from the neighboring TSN system. Since the correction value transmitted from the neighboring TSN system is 0 in FIG. 16, a final correction field value may be D_Link1+R_5GS. Specifically, the UPF 130c may transmit a Sync frame and a Follow_Up frame to a TSN SW 1620, wherein the timestamp may be set to T1 and the correction field may be set to R_5GS+D_Link1. The TSN SW 1620 may transmit a Sync frame and a Follow_Up frame to a slave 1630. The slave 1630 may receive the Sync frame from the TSN SW 1620 at a time T2 1603, wherein the timestamp may be set to T1 and the correction field may be set to D_Link2+R_TSN+R_5GS+D_Link1.

Figure 17:
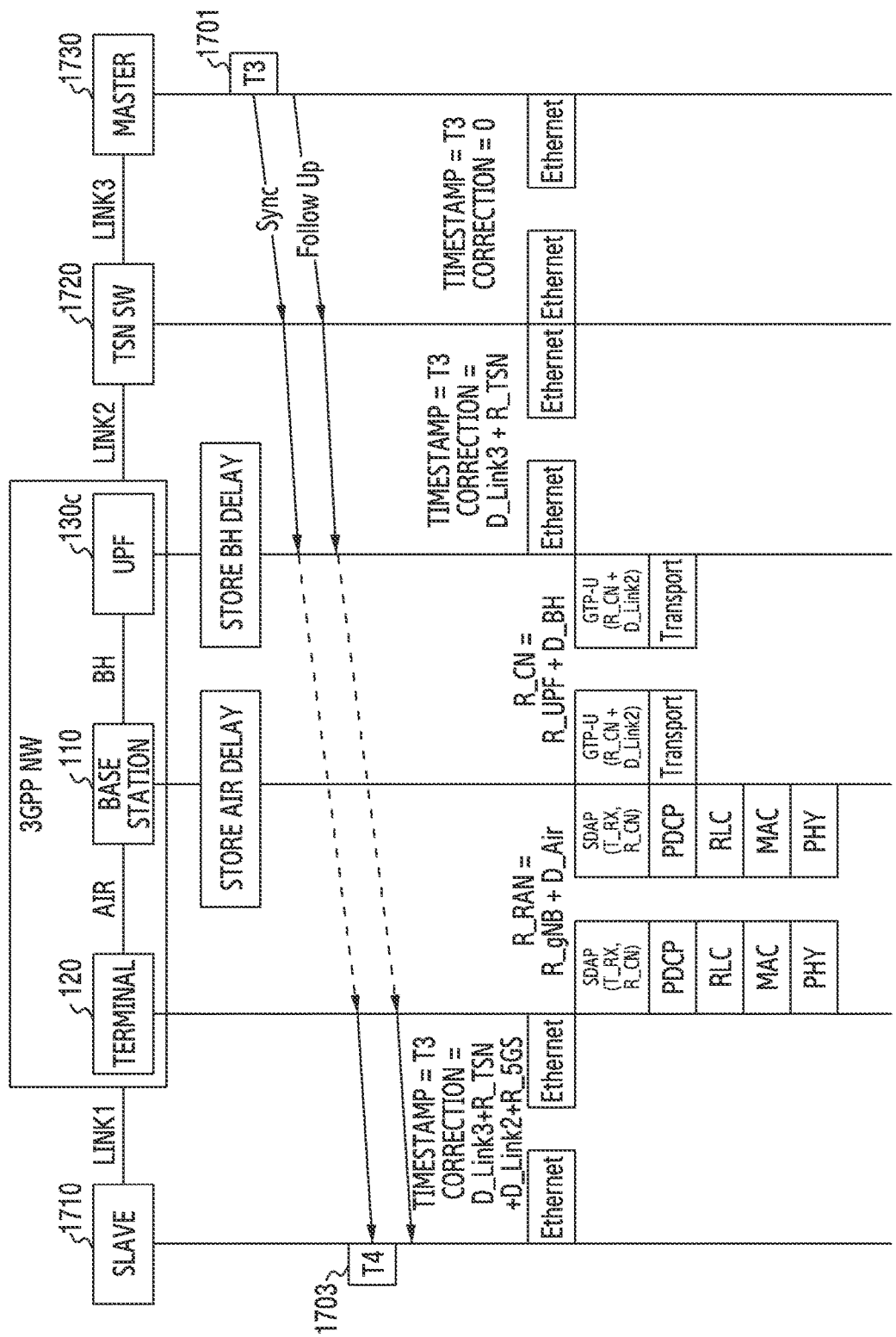
FIG. 17 illustrates a clock synchronization method using downlinks (DLs) of a network supporting a first network system and a bridge model network according to an embodiment of the disclosure.

FIG. 17 illustrates a clock synchronization method using downlinks (DLs) of a network supporting a first network system and a bridge model network according to an embodiment of the disclosure.

Referring to FIG. 17, a first network system may include IEEE 802.1AS. That is, FIG. 17 illustrates the clock synchronization using DLs of the network supporting the IEEE 802.1AS and a bridge model 3GPP network. In FIG. 17, R_UE may denote a residence time in the terminal 120, R_UPF may denote a residence time in a UPF 130c, and R_TSN may denote a residence time in a TSN SW 1720. D_Air may denote air delay between the terminal 120 and a base station 110, and D_BH may denote BH delay between the base station 110 and the UPF 130c. The air delay may be pre-stored in the base station 110. The BH delay may be pre-stored in the UPF 130c. A master 1730 may transmit a Sync frame to a TSN SW 1720 at a time T3 1701, and then transmit a Follow_Up frame. At this time, the timestamp may be set to T3, and the correction field may be set to 0. To calculate R_5GS, the terminal 120 needs to receive a residence time in RAN R_RAN and a residence time in core network R_CN, wherein R_RAN=D_Air+R_gNB and R_CN=D_BH+R_UPF. The UPF 130c may newly define a GTP-U header and transmit R_CN and D_Link2 to the base station 110. In doing so, since the fixed delay QoS class is applied, it may indicate D_BH=BH_DELAY. In addition, the base station 110 may transmit a value of D_Link2+R_CN+R_RAN to the terminal 120 using SDAP. Since the fixed delay QoS class is applied, it may indicate D_Air=AIR_DELAY The terminal 120 may calculate a frame residence time in the terminal R_UE. The terminal 120 may calculate the R_5GS using R_5GS=R_UE+R_RAN+R_CN, and apply to the correction field of the Follow_Up frame of the Sync frame. In FIG. 17, since the correction field value transmitted from the existing TSN system is D_Link3+R_TSN, a final correction field value may be D_Link3+R_TSN+D_Link2+R_5GS. Specifically, the TSN SW 1720 may transmit the Sync frame and the Follow_Up frame received from the master 1730 to the UPF 130c, wherein the timestamp may be set to T3 and the correction field may be set to D_Link3+R_TSN. The UPF 130c may transmit the Sync frame and the Follow_Up frame to the terminal 120 via the base station 110. A slave 1710 may receive the Sync frame and the Follow_Up frame from the terminal 120 at a time T4 1703, wherein the timestamp may be set to T3 and the correction field may be set to D_Link3+R_TSN+D_Link2+R_5GS.

Figure 18:
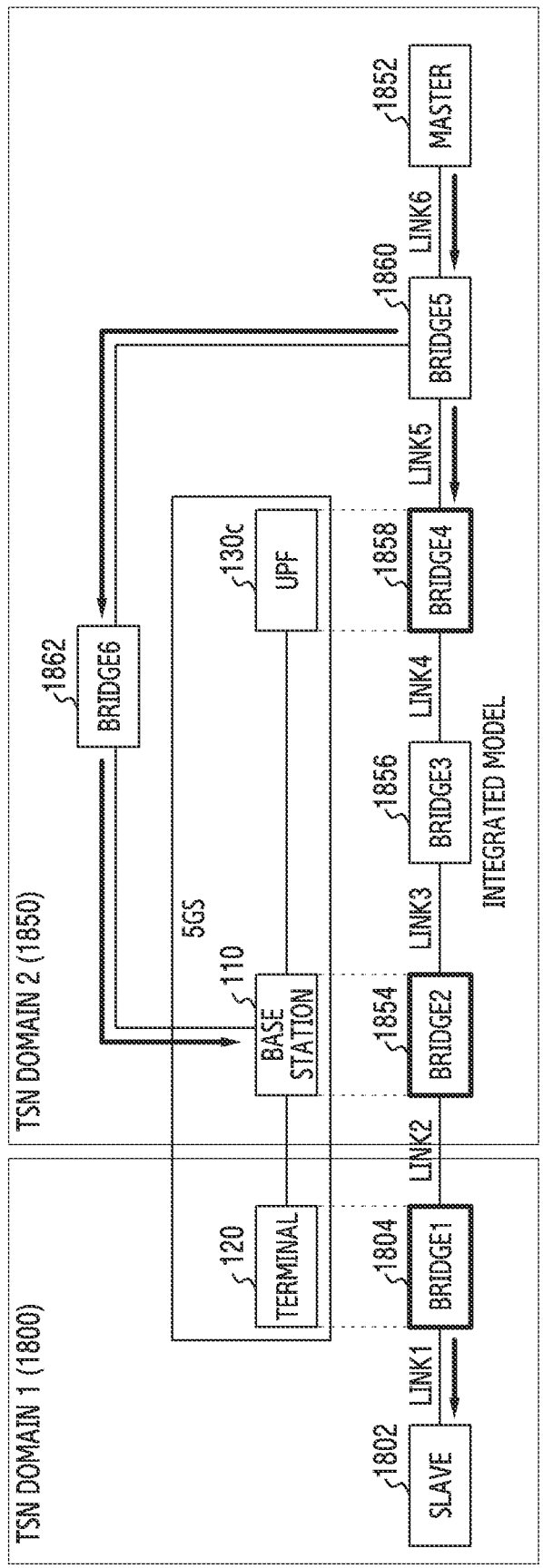
FIG. 18 illustrates a clock synchronization method using DLs of a network supporting a first network system and a network of an integrated model according to an embodiment of the disclosure.

FIG. 18 illustrates a clock synchronization method using DLs of a network supporting a first network system and a network of an integrated model according to an embodiment of the disclosure.

Referring to FIG. 18, a first network system may include IEEE 802.1AS. That is, FIG. 18 illustrates the clock synchronization using DLs of the network supporting the IEEE 802.1AS and a 3GPP network of the integrated model. In this embodiment, it may be assumed that the QoS setup of the fixed delay class is finished already. In the embodiment of FIG. 18, a terminal 120, a base station 110 and a UPF 130c may be synchronized to a TSN system. The terminal 120 and the base station 110 may be synchronized via air frame alignment. An air propagation delay value may be determined to a minimum value of trace values which are triggered from the base station 110 to the terminal 120. The timestamp may be transmitted via medium access control (MAC)/physical layer (PHY) according to a grandmaster configuration, from the terminal 120 to the base station 110, or from the base station 110 to the terminal 120. In the integrated model, the terminal 120, the base station 110 and the UPF 130c of the 3GPP 5GS may participate in the TSN system, and each may be a bridge or an end-station. In various embodiments, the end-station may indicate a node which serves as a master or a slave. Since the neighboring TSN system is connected by wire, the air link between the terminal 120 and the base station 110 may not be connected by wire in FIG. 18. Thus, the TSN domain may be split into two, to support the clock synchronization. In so doing, each domain may require a grandmaster. In addition, the base station 110 and the terminal 120 need to deliver traffic of the 5G NR, and to synchronize to recognize an air frame. That is, the base station 110 and the terminal 120 may be synchronized using other method than the TSN method. Herein, since accuracy may increase only if a specific delay time exists in the traffic transport between the base station 110 and the terminal 120, it may be assumed that the fixed delay QoS class is applied in this embodiment. Such clock synchronization, which is not the synchronization using the Sync and Follow_Up Ethernet frames, may be processed as two split domains in view of the TSN. In general, since the terminal synchronizes to a broadcasting signal of the base station, the clock of one domain may be delivered to the terminal 120 of the other domain. In this case, the clock synchronization between the two domains may be achieved by operating the base station 110 as a slave in its corresponding domain and operating the terminal 120 as a grandmaster in its corresponding domain. Specifically, a first TSN domain 1800 may include the terminal 120, a slave 1802, and a first bridge 1804. A second TSN domain 1850 may include the base station 110, a UPF 130c, a master 1852, a second bridge 1854, a third bridge 1856, a fourth bridge 1858, a fifth bridge 1860 and a sixth bridge 1862. In this case, the grandmaster of the first TSN domain 1800 may be set to the terminal 120, the grandmaster of the second TSN domain 1850 may be set to the master 1852, and a slave of the second TSN domain 1850 may be set to the base station 110. In the relationship of the first TSN domain 1800 and the second TSN domain 1850, the base station 110 may be set to the master, and the terminal 120 may be set to the slave node.

Figure 19:
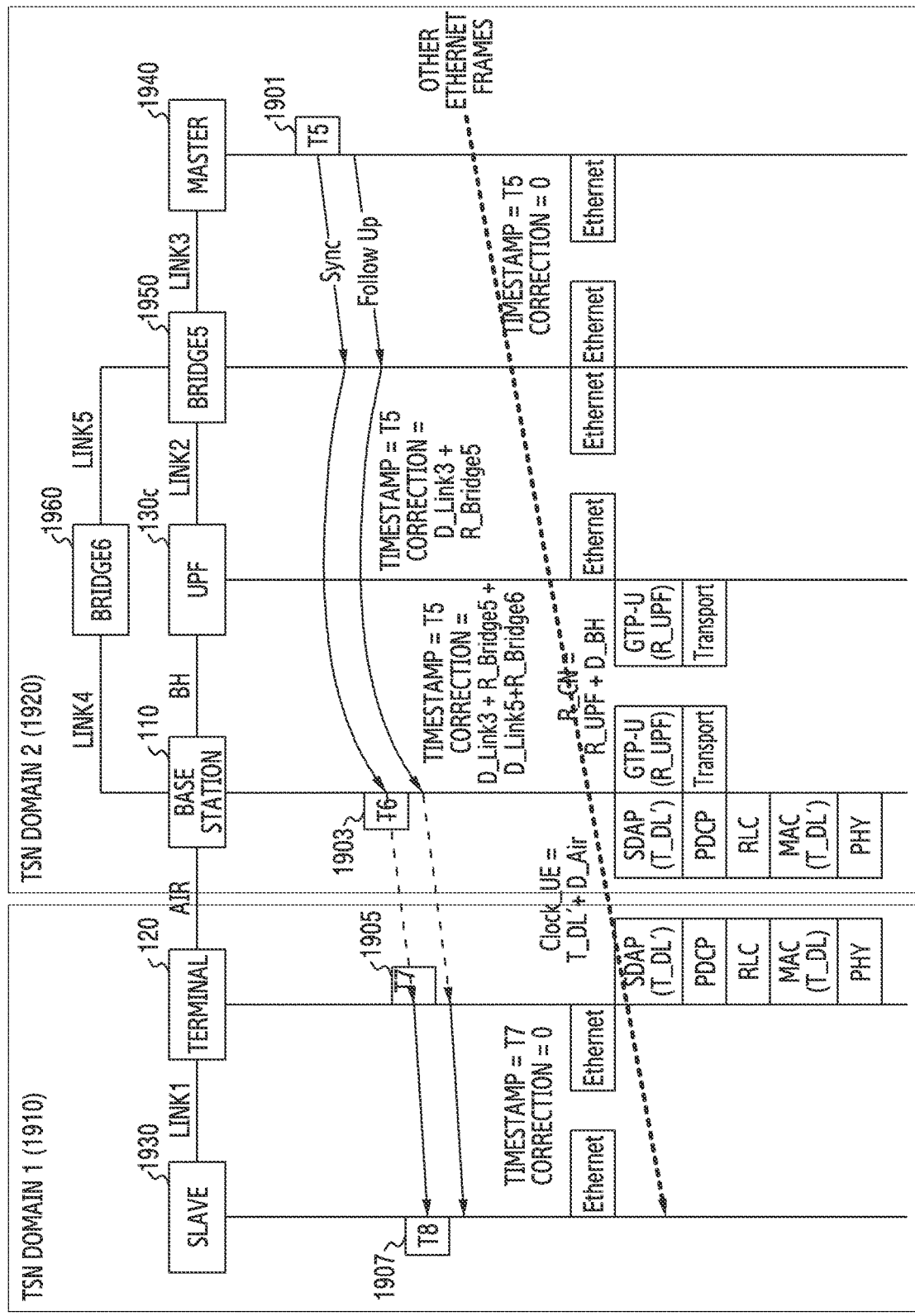
FIG. 19 illustrates an example of clock synchronization using DLs of a network supporting a first network system and a network of an integrated model according to an embodiment of the disclosure.

FIG. 19 illustrates an example of clock synchronization using DLs of a network supporting a first network system and a network of an integrated model according to an embodiment of the disclosure.

Referring to FIG. 19, a first network system may include IEEE 802.1AS. That is, FIG. 19 illustrates the clock synchronization using DLs of the network supporting the IEEE 802.1AS and a 3GPP network of the integrated model. In this embodiment, it may be assumed that the QoS setup of the fixed delay class is finished already. It may be assumed that the residence time is calculated by a terminal 120 or a UPF 130c. It may be assumed that the air delay value is fixed in advance, or fixed by the QoS setup. Clock of the base station 110 should be delivered to the terminal 120. Sync frame reception time T6 1903 of the base station 110 may be corrected by the air TSN based on a Sync frame transmission time T5 1901 of a grandmaster based on Equation 3.

$$T6=D\_Link3+R\_Bridge5+D\_Link5+R\_Bridge6+D\_Link4+T5 \quad \text{Equation 3}$$

In Equation 3, T6 denotes a time at which the base station 110 receives the Sync frame from a fifth bridge 1950, D_Link3 denotes a delay time of a link 3 between a master 1940 and the fifth bridge 1950, R_Bridge5 denotes a residence time in the fifth bridge 1950, D_Link5 denotes a delay time of a link 5 between the fifth bridge 1950 and a sixth bridge 1960, R_Bridge6 denotes a residence time in the sixth bridge 1960, D_Link4 denotes a delay time of a link 4 between the base station 110 and the sixth bridge 1960, and T5 denotes a time at which the master 1940 transmits the Sync frame. The base station 110 may transmit SDAP and MAC frame including DL packet transmission time T D L' to the terminal 120 based on the corrected time. By correcting air delay AIR_DELAY, the terminal 120 may synchronize its clock to a grandmaster of the second TSN domain 1920 of the base station 110. In so doing, the grandmaster of the second TSN domain 1920 may indicate the master 1940. The terminal 120 may use a control message such as a control frame of MAC and a DCI control message of PHY for the air synchronization. The terminal 120 may serve as the grandmaster in its domain (e.g., the first TSN domain 1910), wherein other TSN systems of the corresponding domain (e.g., the first TSN domain 1910) may be clock-synchronized to the terminal 120. The grandmaster in the second TSN domain 1920 may indicate the master 1940, and the slave may indicate the base station 110. Specifically, at the time T5 1901, the master 1940 may transmit a Sync frame and a Follow_Up frame to the fifth bridge 1950, wherein the timestamp may be set to T5 and the correction field may be set to 0. If the fifth bridge 1950 transmits a Sync frame and a Follow_Up frame, wherein the timestamp may be set to T5 and the correction field may be set to D_Link3+R_Bridge5. If the base station 110 transmits a Sync frame at the time T6 1903 and then receives the Follow_Up frame, the timestamp may be set to T5 and the correction field may be set to D_Link3+R_Bridge5+D_Link5+R_Bridge6. The terminal 120 may receive the Sync frame at a time T7 1905. If the slave 1930 receives the Sync frame from the terminal 120 at a time T8 1907, the timestamp may be set to T7 and the correction field may be set to 0.

An apparatus and a method according to various embodiments of the disclosure may achieve synchronization using a wireless communication network.

In addition, an apparatus and a method according to various embodiments of the disclosure may utilize a wireless communication network in an application requiring clock synchronization between nodes, such as factory automation.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements. The reception time may be referred to as the ingress time. The transmission time referred to as the egress time.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a session management function (SMF), in a 5th generation system (5GS) as a time sensitive networking (TSN) bridge, the method comprising:
    obtaining at least one quality of service (QoS) parameter associated with a TSN; and
    transmitting, to a base station, N2 session management (SM) information including information on the at least one QoS parameter associated with the TSN,
    wherein the at least one QoS parameter includes a packet delay budget (PDB) parameter associated with a backhaul delay between the base station and user plane function (UPF),
    wherein an air delay of the base station is determined by subtracting the backhaul delay from a value of the PDB parameter, and
    wherein the PDB parameter associated with the backhaul delay is used to a scheduling by the base station.

2. The method of claim 1,
    wherein the value of the PDB parameter indicates a delay between a user equipment (UE) and the UPF.

3. The method of claim 1, wherein the at least one QoS parameter includes a priority.

4. The method of claim 1, wherein the at least one QoS parameter is received from a policy and control function (PCF).

5. The method of claim 1, wherein the at least one QoS parameter further includes a parameter of a loss tolerance indicating a maximum number of a loss of consecutive packets.

6. A method performed by a base station, in a 5th generation system (5GS) as a time sensitive networking (TSN) bridge, the method comprising:
    receiving, from a session management function (SMF), N2 session management (SM) information including information on at least one QoS parameter associated with a TSN; and
    performing a scheduling based on the N2 SM information including the information on the at least one QoS parameter associated with the TSN,
    wherein the at least one QoS parameter associated with the TSN includes a packet delay budget (PDB) parameter associated with a backhaul delay between the base station and user plane function (UPF), and
    wherein an air delay of the base station is determined by subtracting the backhaul delay from a value of the PDB parameter.

7. The method of claim 6,
    wherein the value of the PDB parameter indicates a delay between a user equipment (UE) and the UPF.

8. The method of claim 6, wherein the at least one QoS parameter includes a priority.

9. The method of claim 6, wherein the at least one QoS parameter is received from a policy and control function (PCF) via the SMF.

10. The method of claim 6, wherein the at least one QoS parameter further includes a parameter of a loss tolerance indicating a maximum number of a loss of consecutive packets.

11. A session management function (SMF), in a 5th generation system (5GS) as a time sensitive networking (TSN) bridge, comprising:
    at least one transceiver; and
    at least one processor operably coupled to the at least one transceiver and configured to:
        obtain at least one quality of service (QoS) parameter associated with a TSN, and
        transmit, to a base station, N2 session management (SM) information including information on the at least one QoS parameter associated with the TSN,
    wherein the at least one QoS parameter includes a packet delay budget (PDB) parameter associated with a backhaul delay between the base station and user plane function (UPF),
    wherein an air delay of the base station is determined by subtracting the backhaul delay from a value of the PDB parameter, and
    wherein the PDB parameter associated with the backhaul delay is used to a scheduling by the base station.

12. The SMF of claim 11,
    wherein the value of the PDB parameter indicates a delay between a user equipment (UE) and the UPF.

13. The SMF of claim 11, wherein the at least one QoS parameter includes a priority.

14. The SMF of claim 11, wherein the at least one QoS parameter is received from a policy and control function (PCF).

15. The SMF of claim 11, wherein the at least one QoS parameter further includes a parameter of a loss tolerance indicating a maximum number of a loss of consecutive packets.

16. A base station, in a 5th generation system (5GS) as a time sensitive networking (TSN) bridge, comprising:
    at least one transceiver; and
    at least one processor operably coupled to the at least one transceiver and configured to:
        receive, from a session management function (SMF), N2 session management (SM) information including information on at least one QoS parameter associated with a TSN, and
        perform a scheduling based on the N2 SM information including the information on the at least one QoS parameter associated with the TSN,
    wherein the at least one QoS parameter associated with the TSN includes a packet delay budget (PDB) parameter associated with a backhaul delay between the base station and user plane function (UPF), and
    wherein an air delay of the base station is determined by subtracting the backhaul delay from a value of the PDB parameter.

17. The base station of claim 16,
wherein the value of the PDB parameter indicates a delay between a user equipment (UE) and the UPF.

18. The base station of claim 16, wherein the at least one QoS parameter includes a priority.

19. The base station of claim 16, wherein the at least one QoS parameter is received from a policy and control function (PCF) via the SMF.

20. The base station of claim 16, wherein the at least one QoS parameter further includes a parameter of a loss tolerance indicating a maximum number of a loss of consecutive packets.

\* \* \* \* \*